(12) United States Patent
Liang et al.

(10) Patent No.: US 6,795,138 B2
(45) Date of Patent: Sep. 21, 2004

(54) TRANSMISSIVE OR REFLECTIVE LIQUID CRYSTAL DISPLAY AND NOVEL PROCESS FOR ITS MANUFACTURE

(75) Inventors: Rong-Chang Liang, Sunnyvale, CA (US); Scott C-J Tseng, Sunnyvale, CA (US); Xuan Phan, Raleigh, NC (US); Ying-Syi Li, San Jose, CA (US); Weijin Li, San Jose, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 150 days.

(21) Appl. No.: 09/759,212

(22) Filed: Jan. 11, 2001

(65) Prior Publication Data

US 2002/0126249 A1 Sep. 12, 2002

(51) Int. Cl.⁷ .............................................. G02F 1/1333
(52) U.S. Cl. ........................... 349/92; 349/189; 349/86; 349/156
(58) Field of Search ................................ 349/156, 189, 349/86, 92

(56) References Cited

U.S. PATENT DOCUMENTS

| | | | |
|---|---|---|---|
| 3,229,607 A | 1/1966 | Battaglia | 95/75 |
| 3,612,758 A | 10/1971 | Evans et al. | 178/5.4 R |
| 3,668,106 A | 6/1972 | Ota | 204/299 |
| 3,689,346 A | 9/1972 | Rowland | 156/245 |
| 3,885,964 A | 5/1975 | Nacci | 430/326 |
| 3,908,052 A | 9/1975 | Sanders | 428/1 |
| 3,928,671 A | 12/1975 | Robusto et al. | 427/88 |
| 4,071,430 A | 1/1978 | Liebert | 204/299 |
| 4,093,534 A | 6/1978 | Carter et al. | 350/355 |
| 4,190,352 A | 2/1980 | Bruning | 355/19 |
| 4,285,801 A | 8/1981 | Chiang | 204/299 |
| 4,680,103 A | 7/1987 | Beilin Solomon I. et al. | 204/299 |
| 4,741,604 A | 5/1988 | Kornfeld | 359/296 |
| 4,741,988 A | 5/1988 | Van der Zande et al. | 430/312 |
| 4,891,245 A | 1/1990 | Micale | 427/213.3 |
| 4,924,257 A | 5/1990 | Jain | 355/53 |
| 5,200,120 A | 4/1993 | Sakai | 264/1.33 |
| 5,274,481 A | 12/1993 | Kim | 359/51 |
| 5,276,438 A | 1/1994 | DiSanto et al. | 345/107 |
| 5,279,511 A | 1/1994 | DiSanto et al. | 445/24 |
| 5,285,236 A | 2/1994 | Jain | 355/53 |
| 5,380,362 A | 1/1995 | Schubert | 106/493 |
| 5,398,041 A | 3/1995 | Hyatt | 345/87 |
| 5,403,518 A | 4/1995 | Schubert | 252/572 |
| 5,432,526 A | 7/1995 | Hyatt | 345/87 |
| 5,450,220 A * | 9/1995 | Onishi et al. | 349/89 |
| 5,573,711 A | 11/1996 | Hou et al. | 252/572 |
| 5,589,100 A | 12/1996 | Grasso et al. | 252/299.01 |
| 5,652,645 A | 7/1997 | Jain | 355/53 |
| 5,699,097 A | 12/1997 | Takayama et al. | 347/171 |
| 5,731,860 A | 3/1998 | Harada et al. | 349/158 |
| 5,739,889 A | 4/1998 | Yamada et al. | 349/156 |
| 5,835,174 A | 11/1998 | Clikeman et al. | 349/86 |

(List continued on next page.)

FOREIGN PATENT DOCUMENTS

| | | | |
|---|---|---|---|
| CA | 2340683 | 2/2001 | |
| DE | 199 27 359.6 | 12/2000 | |
| EP | 0 990 942 A1 | 4/2000 | G02F/1/1339 |

(List continued on next page.)

OTHER PUBLICATIONS

U.S. patent application Ser. No. 09/518,488, Liang et al., filed Mar. 3, 2000.

(List continued on next page.)

*Primary Examiner*—Kenneth Parker
(74) *Attorney, Agent, or Firm*—Viola T. Kung; Howrey, Simon, Arnold & White, LLP

(57) ABSTRACT

This invention relates to liquid crystal (LC) displays comprising cells of well-defined shape, size and aspect ratio which cells are filled with a liquid crystal composition preferably containing dichroic dye(s), and novel processes for their manufacture.

35 Claims, 18 Drawing Sheets

U.S. PATENT DOCUMENTS

| | | | |
|---|---|---|---|
| 5,843,333 A * | 12/1998 | Hakemi | 252/299.5 |
| 5,877,848 A | 3/1999 | Gillette et al. | 355/85 |
| 5,895,541 A | 4/1999 | Kobayashi et al. | 156/240 |
| 5,914,806 A | 6/1999 | Gordon, II et al. | 359/296 |
| 5,930,026 A | 7/1999 | Jacobson et al. | 359/296 |
| 5,942,154 A | 8/1999 | Kim et al. | 252/299.01 |
| 5,956,112 A * | 9/1999 | Fujimori et al. | 349/156 |
| 5,961,804 A | 10/1999 | Jacobson et al. | 204/606 |
| 5,976,405 A | 11/1999 | Clikeman et al. | 252/299.01 |
| 5,985,084 A | 11/1999 | Summersgill et al. | 156/273.7 |
| 5,995,190 A * | 11/1999 | Nagae et al. | 349/156 |
| 6,017,584 A | 1/2000 | Albert et al. | 427/213.3 |
| 6,018,383 A | 1/2000 | Dunn et al. | 355/49 |
| 6,037,058 A | 3/2000 | Clikeman et al. | 428/402.2 |
| 6,064,508 A | 5/2000 | Forgette et al. | 359/267 |
| 6,067,185 A | 5/2000 | Albert et al. | 359/296 |
| 6,113,810 A | 9/2000 | Hou et al. | 252/572 |
| 6,113,836 A | 9/2000 | Sakai et al. | 347/171 |
| 6,120,588 A | 9/2000 | Jacobson | 106/31.16 |
| 6,120,839 A | 9/2000 | Comiskey et al. | 427/213.3 |
| 6,120,946 A | 9/2000 | Johnson et al. | 430/7 |
| 6,166,797 A | 12/2000 | Bruzzone et al. | 349/155 |
| 6,172,798 B1 | 1/2001 | Albert et al. | 359/296 |
| 6,181,393 B1 * | 1/2001 | Enomoto et al. | 349/86 |
| 6,184,856 B1 | 2/2001 | Gordon et al. | 345/107 |
| 6,191,250 B1 * | 2/2001 | Aida et al. | 528/196 |
| 6,239,896 B1 | 5/2001 | Ikeda | 359/240 |
| 6,312,304 B1 | 11/2001 | Duthaler et al. | 445/24 |
| 6,327,072 B1 | 12/2001 | Comiskey et al. | 259/296 |
| 6,337,761 B1 | 1/2002 | Rogers et al. | 359/296 |
| 6,392,785 B1 | 5/2002 | Albert et al. | 359/296 |
| 6,392,786 B1 | 5/2002 | Albert | 359/296 |
| 6,400,430 B2 | 6/2002 | Nakao et al. | 349/89 |
| 6,400,492 B1 | 6/2002 | Morita et al. | 264/400 |
| 6,512,626 B1 | 1/2003 | Schmidt | 359/296 |
| 6,514,328 B1 | 2/2003 | Katoh et al. | 106/31.28 |
| 6,525,865 B2 | 2/2003 | Katase et al. | 359/296 |
| 2002/0018043 A1 | 2/2002 | Nakanishi | |
| 2002/0029969 A1 | 3/2002 | Yager et al. | |
| 2002/0075556 A1 | 6/2002 | Liang et al. | |
| 2002/0131152 A1 | 9/2002 | Liang et al. | |
| 2002/0182544 A1 | 12/2002 | Chan-Park et al. | |
| 2002/0188053 A1 | 12/2002 | Zang et al. | |
| 2002/0196525 A1 | 12/2002 | Chen et al. | |
| 2003/0007238 A1 | 1/2003 | Liang et al. | |
| 2003/0039022 A1 | 2/2003 | Liang et al. | |
| 2003/0053190 A1 | 3/2003 | Liang et al. | |

FOREIGN PATENT DOCUMENTS

| | | | |
|---|---|---|---|
| EP | 1 065 553 A1 | 1/2001 | G02F/1/1333 |
| EP | 1 089 118 A2 | 4/2001 | G02F/1/167 |
| EP | 1195603 | 4/2002 | |
| JP | 57-104116 | 6/1982 | G02F/1/17 |
| JP | 59 171930 | 9/1984 | G02F/1/19 |
| JP | 60205452 | 10/1985 | G03F/7/20 |
| JP | 64-86116 | 3/1989 | G02F/1/19 |
| JP | 2-223934 | 9/1990 | G02F/1/167 |
| JP | 2-284125 | 11/1990 | G02F/1/167 |
| JP | 02284126 | 11/1990 | |
| JP | 6-242423 | 2/1994 | G02F/1/1333 |
| JP | 2000035677 | 2/2000 | G03F/7/23 |
| JP | 2000075497 | 3/2000 | G03F/7/24 |
| JP | 2001042118 | 2/2001 | G02B/5/20 |
| JP | 2001 056653 | 2/2001 | |
| WO | WO 98/57226 | 12/1998 | G02F/1/136 |
| WO | WO 99/08151 | 2/1999 | G02F/1/1339 |
| WO | WO 99/53373 | 10/1999 | |
| WO | WO 99/56171 | 11/1999 | G02F/1/167 |
| WO | WO 00/03291 | 1/2000 | G02F/1/167 |
| WO | WO 00/36649 | 6/2000 | H01L/23/532 |
| WO | WO 00/60410 | 10/2000 | G02F/1/167 |
| WO | WO 00/77571 | 12/2000 | |
| WO | WO 01/67170 | 9/2001 | G02F/1/167 |
| WO | WO 02/01281 | 1/2002 | G02F/1/00 |
| WO | WO 02/56097 | 7/2002 | |
| WO | WO 02/65215 | 8/2002 | |
| WO | WO 03/19280 | 3/2003 | G02F/1/167 |

OTHER PUBLICATIONS

U.S. patent application Ser. No. 10/388,890, Liang et al., filed Mar. 14, 2003.

U.S. patent application Ser. No. 10/351,460, Liang et al., filed Jan. 24, 2003.

U.S. patent application Ser. No. 10/372,027, Liang et al., filed Feb. 21, 2003.

U.S. patent application Ser. No. 10/444,760, Liang et al., filed May 23, 2003.

U.S. patent application Ser. No. 09/606,654, Liang et al., filed Jun. 28, 2000.

Dalisa, A. "Electrophoretic Display Technology", *IEEE Transactions on Electron Devices*, pp. 827, 1977.

Hooper, M., et al., "An Electrophoretic Display, Its Properties, Model and Addressing", *IEEE Transactions on Electron Devices*, vol. 26, No. 8, pp. 1148–1152, 1979.

Singer, B., "An X–Y Addressable Electrophoretic Display", *Proc. SID—18*(3/4):255–266 (1977).

Murau, P., et al., "The understanding and elimination of some suspension instabilities in an electrophoretic display", *Journal of Applied Physics*, vol. 49, No. 9, pp. 4820–4829, 1978.

Comiskey et al., "An electrophoretic ink for all–printed reflective electronic displays", Letters to Nature, May, 1998.

Harbour, J.R. et al., "Subdivided Electrophoretic Display" *Xerox Disclosure Journal*, vol. 4, No. 6, pp. 705, Nov. 1979.

Lewis, J. "Electrophoretic Displays", Allen Clark Research Centre, pp. 223–240.

Nakamura, et al., "Development of Electrophoretic Display Using Microcapsulated Suspension" *SID Digest*, pp. 1014–1017, 1998.

Ota, et al., "Electrophoretic Image Display (EPID) Panel", *Proceedings of the IEEE*, vol. 501, No. 7, Jul. 1973.

Bryning et al., "Reverse–Emulsion Electrophoretic Display (REED)" *SID 98 Digest* 1018–1021 (1998).

Inoue, S. et al., "High Resolution Microencapsulated Electrophoretic Display (EPD) Driven by Poly–Si TFTs With Four–Level Grayscale" *IEEE Transactions on Electron Devices* 49(8):1532–1539 (2002).

Kazlas, P. et al., "SVGA Microencapsulated Electorphoretic Active Matrix Display for Information Applicances" *SID 01 Digest* 152–155 (2001).

Kishi, E et al, "5.1 Development of In–Plane EPD", Canon Research Center, *SID Digest* p. 24–27 (2000).

Liang, R.C. et al., "Microcup® LCD ANew Type of Dispersed LCD by A Roll–to–Roll Manufacturing Process" *Proc. of the IDCM '03*, Taipei International Convention Center Taiwan (Feb. 18–21, 2003).

Matsuda Y. "Newly designed, high resolution, active matrix addressing in plane EPD" *IDW 02 EP2-3* 1341–1344 (2002).

Ota et al. "Developments in Electrophoretic Displays" *Proc. of SID* 18:243–254 (1977).

Singer, B. "X–Y Addressable Electrophoretic Display", *Proc. SID–18* (3/4): 255–266 (1977).

Swanson et al., "High Performance Electrophoretic Displays" *SID 00 Digest* 29–31 (2000).

Drzaic, P.S., "Liquid Crystal Dispersions" (1995). Only Table of Contents p. 1–7 provided.

Harvey, T.G., "Replication Techniques for Micro–Optics", SPIE Proc. vol. 3099, 76–82 (1997).

Slafer, Dennis W. et al., "Continuous Manufacturing of Thin Cover Sheet Optical Media," SPIE Proc., vol. 1663, 324–335 (1992).

* cited by examiner

Off State
Scatters Light, White

On State
Transparent, Clear

SEM Micrograph of Microcups
4.3 x 4.3 x 4.4 x 2.4 μm (5000x)
(L x W x D x Wall)
Opening Area 41%

SEM Micrograph of Microcups
3.5 x 3.5 x 3.5 x 2.5 μm (2000x)
(L x W x D x Wall)
Opening Area 34%

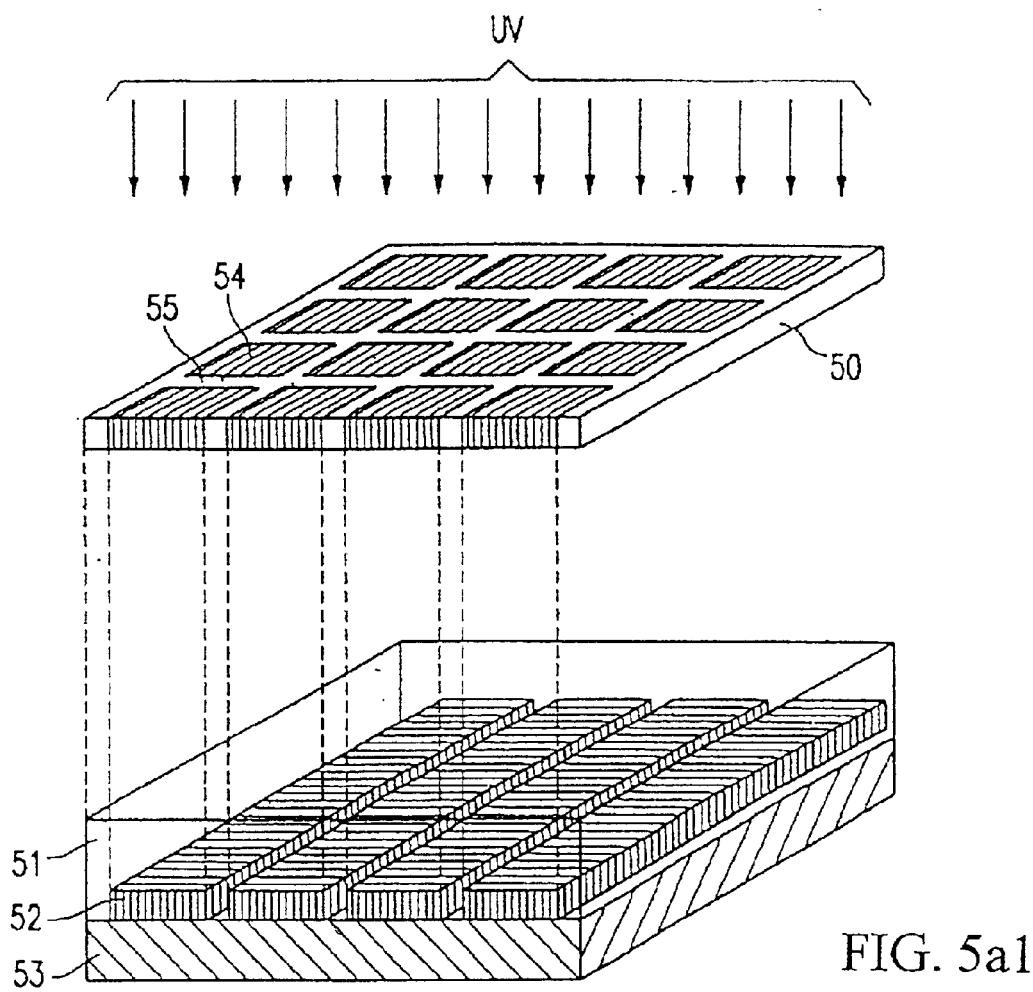
FIG. 5a1
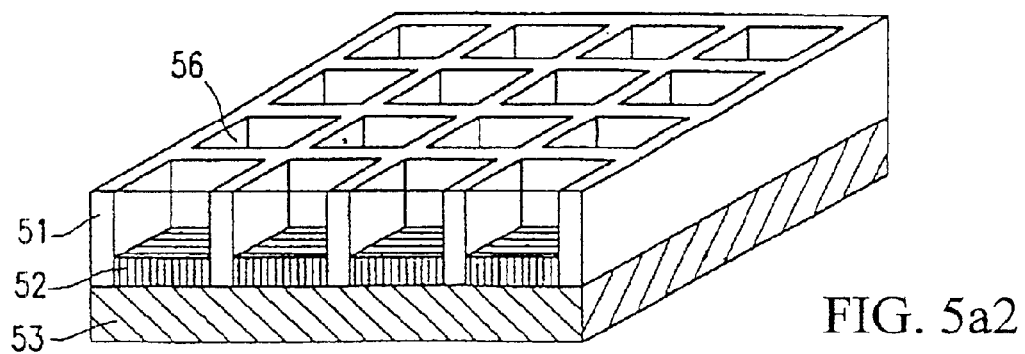
FIG. 5a2

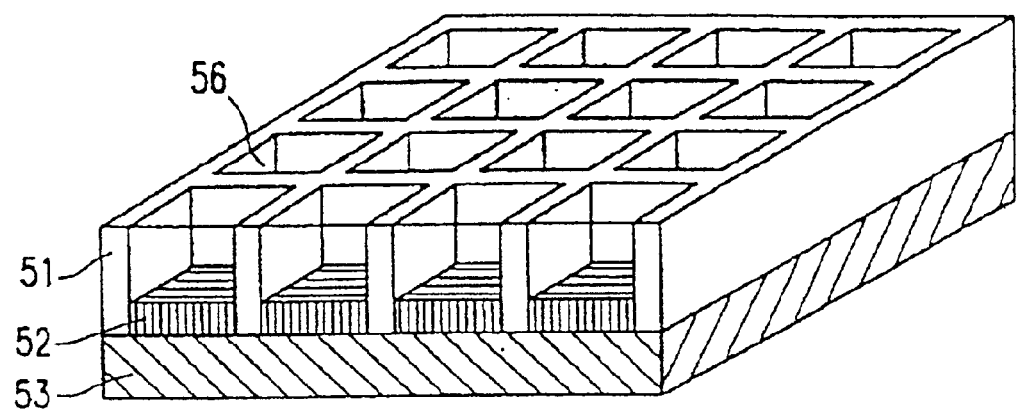
FIG. 5b2
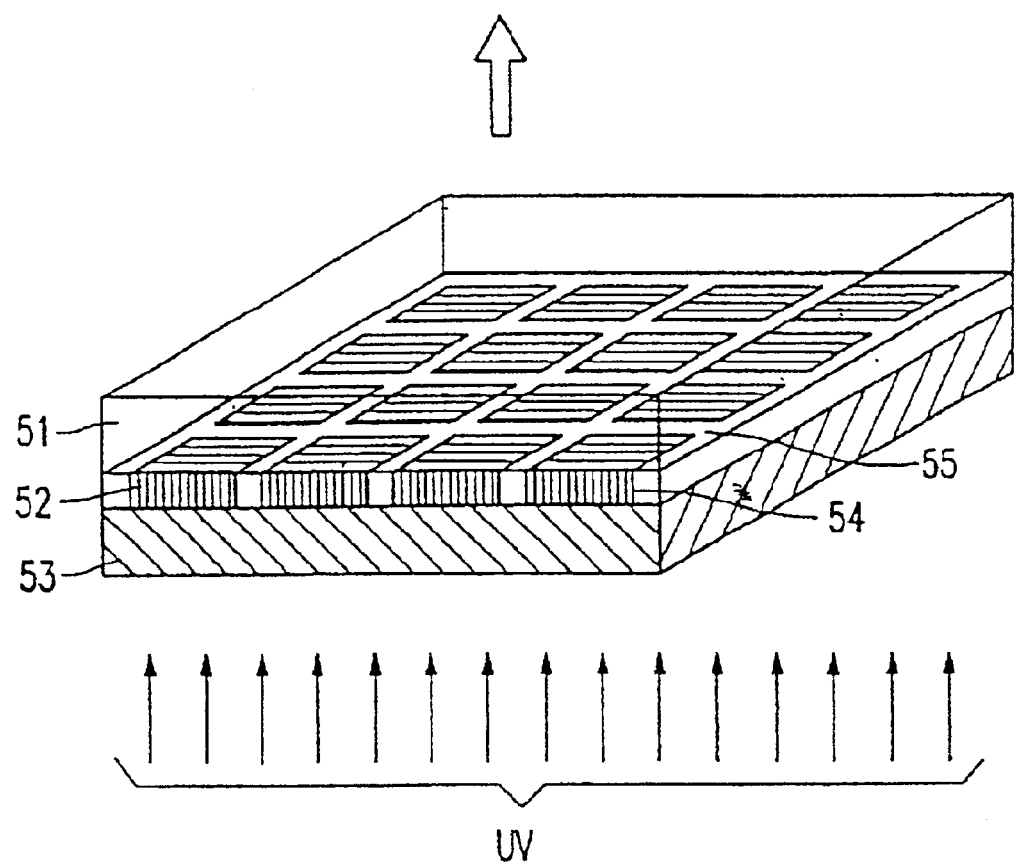
FIG. 5b1

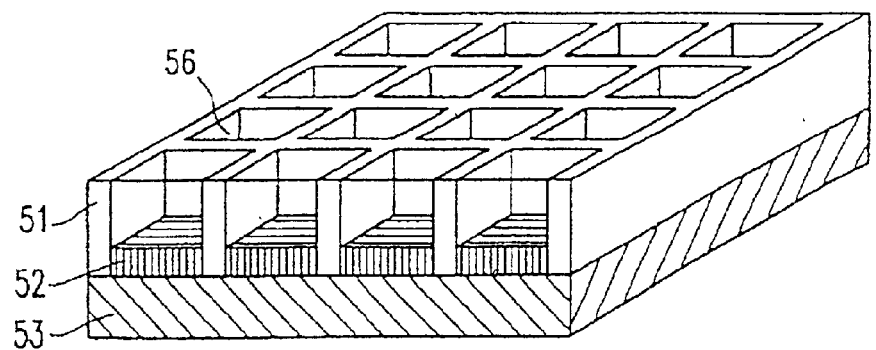
FIG. 5c2
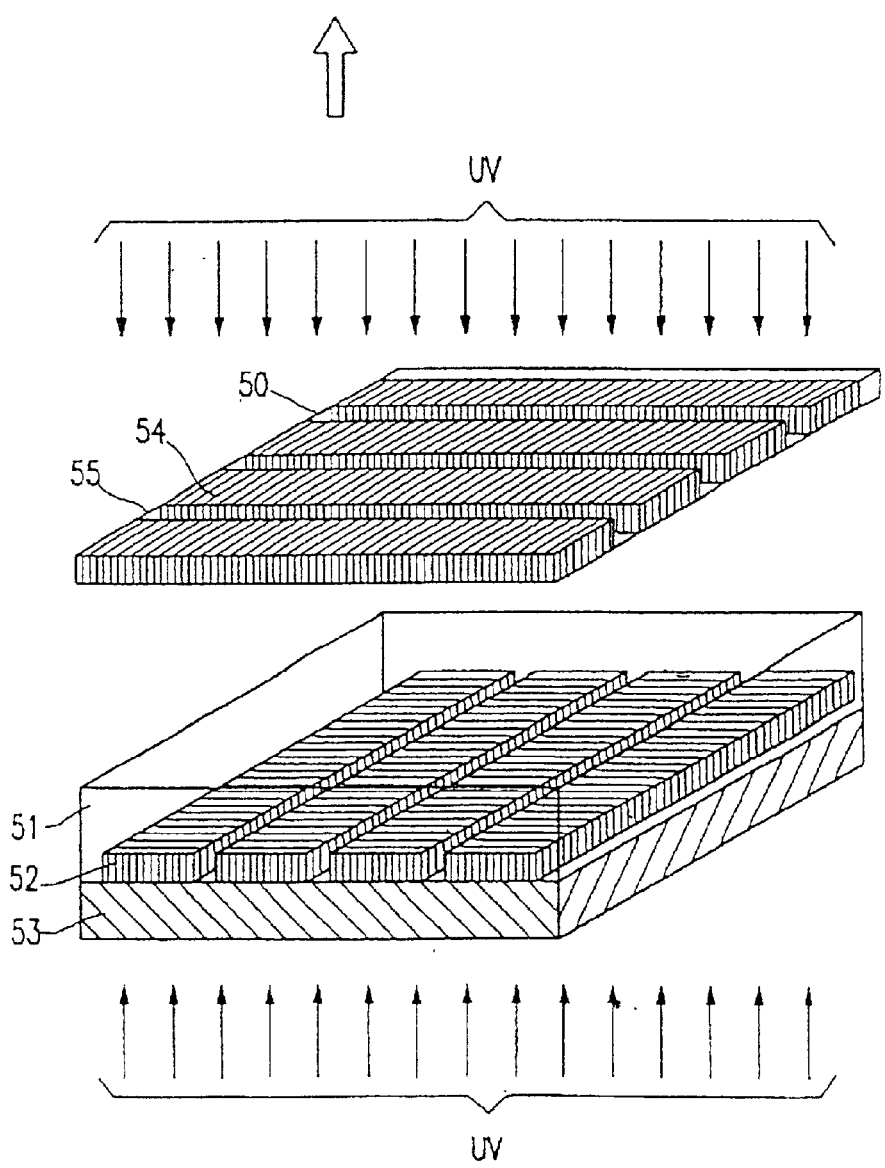
FIG. 5c1

Hysteresis Curve of Conventional PDLC

Hysteresis Curve of a LCD of the Current Invention

TRANSMISSIVE OR REFLECTIVE LIQUID CRYSTAL DISPLAY AND NOVEL PROCESS FOR ITS MANUFACTURE

BACKGROUND OF THE INVENTION a) Field of the Invention

This invention relates to liquid crystal displays comprising cells of well-defined shape, size and aspect ratio, which are filled with liquid crystals, preferably with a guest dye, and novel processes for their manufacture.

b) Background

A polymer dispersed liquid crystal (PDLC) display usually comprises two transparent plates with electrodes placed opposing each other, separated by using spacers. A thin film of PDLC is enclosed between the two plates. The PDLC film may be up to 200 microns thick, but usually having a thickness of between 2 microns and 50 microns. The cell is hermetically sealed in order to eliminate oxygen and moisture, both of which may chemically attack the liquid crystals. A thorough review of the PDLC technologies can be found in the book "Liquid Crystal Dispersions" by P. S. Drzaic (1995).

A PDLC typically consists of micron-size droplets of a low-molecular-weight nematic liquid crystal dispersed in a polymer binder. The nematic droplets strongly scatter light and the material has a white opaque or translucent appearance ("off state"). When a voltage difference is imposed between the two electrodes ("on state"), the electric field aligns the droplets such that the ordinary refractive index of the liquid crystal nearly matches that of the isotropic polymer matrix, substantially reducing the scattering power of the droplets, and thus allowing light to transmit through. In the on state, the cell thus appears clear or transparent, in the off state it appears opaque.

In a guest-host PDLC display, a dye, particularly a pleochroic or dichroic dye, is added as a guest to the liquid crystal to produce a high color contrast display. For example, because the dye molecules have a property to orientate parallel to the liquid crystal molecules, if a dichroic dye having a bar-shaped structure is added to the liquid crystal, the direction of the dye molecules also changes if the molecular direction of the liquid crystal is changed by applying an electric field on the opposing electrodes. Because this dye is made colored or not depending on the orientation direction, it is possible to switch between a colored state ("off state") and a colorless state ("on state") by applying a voltage on the two electrodes. The use of dichroic or pleochroic dyes in guest-host PDLC displays to improve the contrast ratio is well known in the art.

A PDLC display may be transmissive and/or reflective. A transmissive PDLC display has an internal illumination source. Imposing a voltage on the two electrodes allows light to pass through the cell. A typical example of a transmissive PDLC display is a PDLC overhead projector. Reflective PDLC displays typically contain a reflective black or colored filter which becomes visible in the transparent state. Reflective PDLC displays may be found in PDA (personal digital assistant) devices. Transmissive and reflective PDLC displays are particularly attractive because polarizers are eliminated. Polarizers substantially reduce light and decrease brightness of both direct view and projection displays. The absence of polarizers also gives a better viewing angle.

The PDLC displays prepared by prior art processes have many shortcomings. For example, the polymer dispersed liquid crystals typically have droplets of very broad particle size distribution, which results in significant hysteresis, higher operation voltage, poor contrast ratio, undesirable red bleedthrough, and low level of multiplexing. However, the hysteresis of PDLC films must be low to show reproducible gray scales, and low voltage operation and high contrast ratio of the device is essential for most PDA applications. Monodispersed liquid crystal particles in the micron size range have been taught in U.S. Pat. No. 5,835,174, (Clikeman, et al.) U.S. Pat. No. 5,976,405 (Clikeman, et al.), and U.S. Pat. No. 6,037,058 (Clikeman, et al.) to reduce the hysteresis and operation voltage, and improve the level of multiplexity. The contrast ratio of PDLC device prepared from the monodispersed particles remains low for most applications. To improve the contrast ratio without trade off in the thickness of the PDLC film and operation voltage, guest dyes preferably, pleochroic dyes or dichroic dyes are needed. However, the prior art processes do not allow for the precise enclosure of a high concentration of guest dyes in the liquid crystal phase during the manufacturing process, such that only a low concentration of dyes may be encapsulated in the monodispersed polymer particles. Some guest dyes may be left outside of the particles, thereby resulting in an increase in Dmin and a lower contrast ratio.

It is highly desirable to create monodispered liquid crystal domains, which would alleviate the requirement of high operation voltage, allow high contrast ratio and high level of multiplexing, and reduce hysteresis.

SUMMARY OF THE INVENTION

The first aspect of the present invention is directed to a liquid crystal (LC) display comprising cells of substantially uniform shape, size and aspect ratio. The cells are filled with LC preferably with guest dye(s).

Another aspect of the invention relates to a novel process for the manufacture of such a LC display.

A further aspect of the invention relates to the preparation of cells of substantially uniform shape, size and aspect ratio. The cells enclose LC preferably with guest dye(s) and are formed from microcups prepared according to the present invention. Briefly, the process for the preparation of the microcups involves embossing a thermoplastic or thermoset precursor layer coated on a conductor film with a pre-patterned male mold, followed by releasing the mold before, during or after the thermoplastic or thermoset precursor layer is hardened by radiation, cooling, solvent evaporation, or other means. Alternatively, the microcups may be formed from imagewise exposure of the conductor film coated with a radiation curable layer followed by removing the unexposed areas after the exposed areas have become hardened.

Solvent-resistant, thermomechanically stable microcups having substantially monodispersed size and shape can be prepared by either one of the aforesaid methods. The size of microcups for most display applications is in the range of submicrons to 10 microns, more preferably 0.5 microns to 5 microns. The shape may be any shape, although a shape allowing a higher total area of interface between liquid crystal and the cups is preferred. The microcups are then filled with LC preferably with guest dye(s), and sealed.

Yet another aspect of the present invention relates to the sealing of the microcups filled with the LC preferably with guest dye(s). Sealing can be accomplished by a variety of ways. Preferably, it is accomplished by dispersing into the LC phase before the filling step, a sealant composition containing a thermoplastic or thermoset precursor. The sealant composition is immiscible with the LC and has a specific gravity lower than that of the LC. After filling, the thermoplastic or thermoset precursor phase separates and forms a supernatant layer at the top of the LC. The sealing of the microcups is then conveniently accomplished by hardening the precursor layer by solvent evaporation, interfacial reaction, moisture, heat, or radiation. UV radiation is the preferred method to seal the microcups, although a combination of two or more curing mechanisms as described above may be used to increase the throughput of sealing. Alternatively, the sealing can be accomplished by overcoating the LC with a sealant composition containing the thermoplastic or thermoset precursor. The solvent used in the sealant composition is critical. Preferably, it is immiscible with the LC and has a specific gravity tower than that of the LC. It is also important to control the surface tension and viscosity of the sealant composition to ensure a good coating uniformity. The sealing is then accomplished by hardening the sealant composition by solvent evaporation, interfacial reaction, moisture, heat, radiation, or a combination of curing mechanisms. These seating processes are also unique features of the present invention.

Yet another aspect of the present invention relates to the absence of the hysteresis of the LC displays. The LC displays of the present invention consist of substantially monodispersed microcups filled with liquid crystals and preferably a guest dye. The composition of the microcups is optimized such that the isotropic refractive index of the cups is matched to the ordinary refractive index of the LC. In a manner similar to conventional PDLC displays, the LC displays of the present invention strongly scatter light in the absence of an electric field (the "off states"). When a voltage difference is applied between the two electrodes, the electric field aligns the LC which substantially reduces scattering power and allows light to transmit through the "on state". However, unlike the PDLC displays, the LC displays of this invention reach the maximum optically clear state at a much lower voltage and, when the applied voltage is withdrawn, reverts back to the original "off" state without undesirable hysteresis. The low operation voltage, fast response time, and the absence of hysteresis of the displays of the present invention are critical for high quality display applications where low power consumption, reproducible gray scales and video rate are highly desirable.

Yet another aspect of the present invention relates to the manufacture of a LC display comprising stack of layers of microcups. The processing steps include preparation of the first layer of microcups on a conductor substrate by anyone of the methods described above, filling the microcups with a LC composition, sealing, and finally laminating the sealed microcups with a second conductor substrate precoated with an adhesive layer. The adhesives can be hot-melt, heat curable, moisture curable, or radiation curable adhesives. Of particular interest, UV curable adhesives are used in the present invention. To improve the contrast ratio, more than one layer of the microcup array may be used. The processing steps include preparation of microcups, filling with the LC composition, sealing, overcoating or laminating the sealed microcup array with a second layer of the microcup forming composition, forming the second microcup array with any of the methods described previously, preferably by the embossing method, repeating several times the steps of filling and sealing of microcups, overcoating or laminating the sealed microcups with another layer of microcup forming composition, and finally laminating the stack of microcup layers to a second conductor substrate precoated with an adhesive layer.

Yet another aspect of the present invention relates to a process for the manufacture of a full color reflective LC display by using a conductor substrate precoated with (R, G, B) color filers and preferably a black matrix. Alternatively a full color display can be prepared by laminating the preformed microcups with a layer of positively working photoresist, selectively opening a certain number of the microcups by imagewise exposing the positive photoresist, followed by developing the resist, filling the opened microcups with a LC composition containing guest dye(s), preferably dichroic dyes of the first color, and sealing the filled microcups by a sealing process described previously. These steps may be repeated to create sealed microcups filled with LC compositions containing guest dyes of the second or the third color. A black background may be used to improve the contrast ratio and color saturation.

These multiple-step processes as disclosed may be carried out roll-to-roll continuously or semi-continuously. Consequently, they are suitable for high volume and low cost production. These processes are also efficient and inexpensive as compared to other processes for high volume production operations. The LC display prepared according to the present invention is not sensitive to environment, particularly humidity and temperature. The display may be very thin, flexible, durable, easy-to-handle, and format-flexible. Since the LC display prepared according to the present invention comprises cells of favorable aspect ratio and substantially monodispersed shape and size, the displays manufactured according to the present invention exhibit many desirable properties such as low power consumption, fast response time, high level of multiplexing, high contrast ratio, and reproducible gray scale presentation due to the absence of undesirable hysteresis.

BRIEF DESCRIPTION OF THE DRAWINGS

FIGS. 5a1, 5a2, 5b1, 5b2, 5c1, and 5c2 show alternative processing steps for preparing the microcups involving imagewise exposure of the conductor film coated with a thermoset precursor to UV radiation.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations created by microembossing or imagewise exposure.

The term "cell", in the context of the present invention, is intended to mean the single unit formed from a sealed microcup. The cells are filled with liquid crystals preferably with guest dye(s).

The term "well-defined", when describing the microcups or cells, is intended to indicate that the microcup or cell has a definite shape, size and aspect ratio which are predetermined according to the specific parameters of the manufacturing process.

The term "monodispersed", when describing the microcups or cells, is intended to indicate that the microcup or cell has a narrow distribution of dimensions such as diameter, length, width, and height.

The term "aspect ratio" is a commonly known term in the art of PDLC displays. In this application, it refers to the depth to width or depth to length ratio of the microcups.

Preferred Embodiments

Figure 1A:
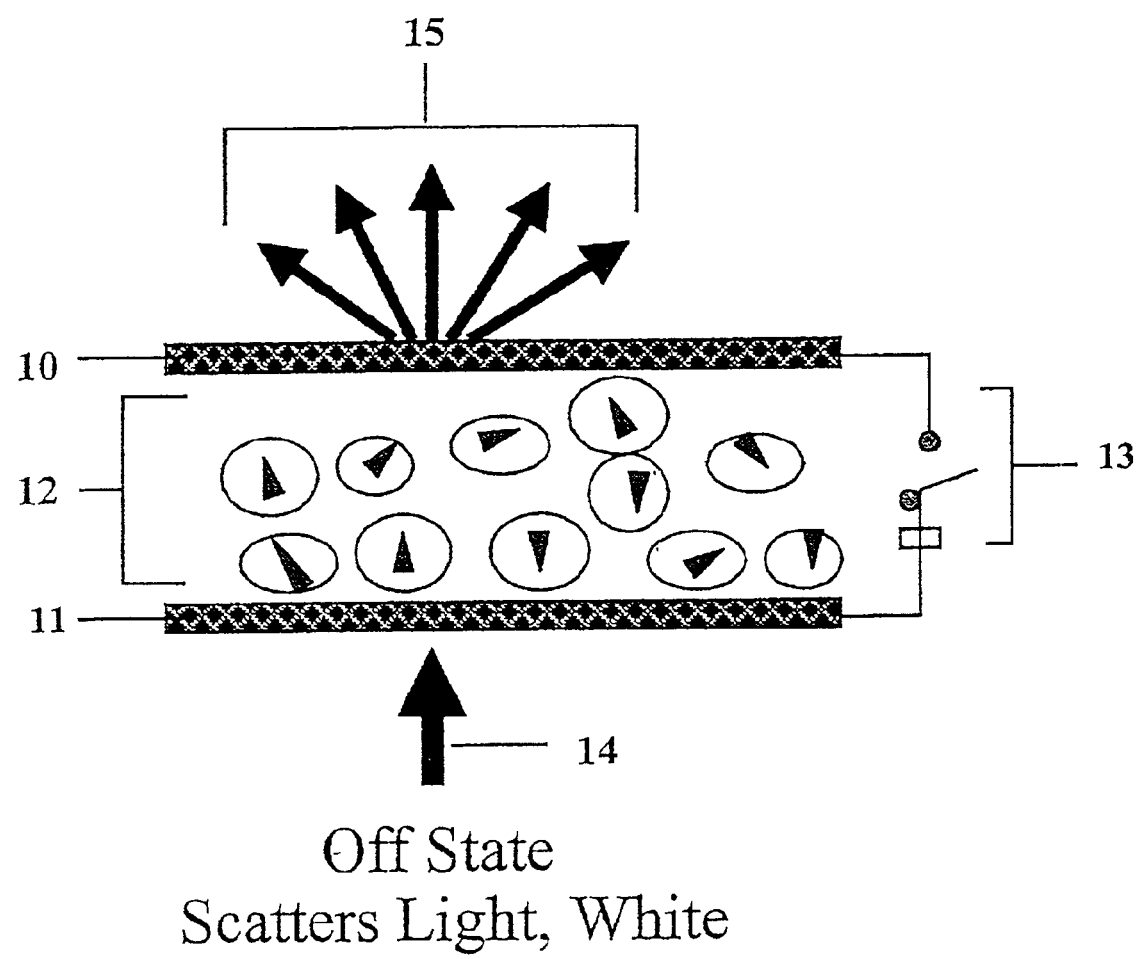
FIGS. 1a and 1b show the "off" and "on" states respectively of a typical PDLC device.
Figure 1B:
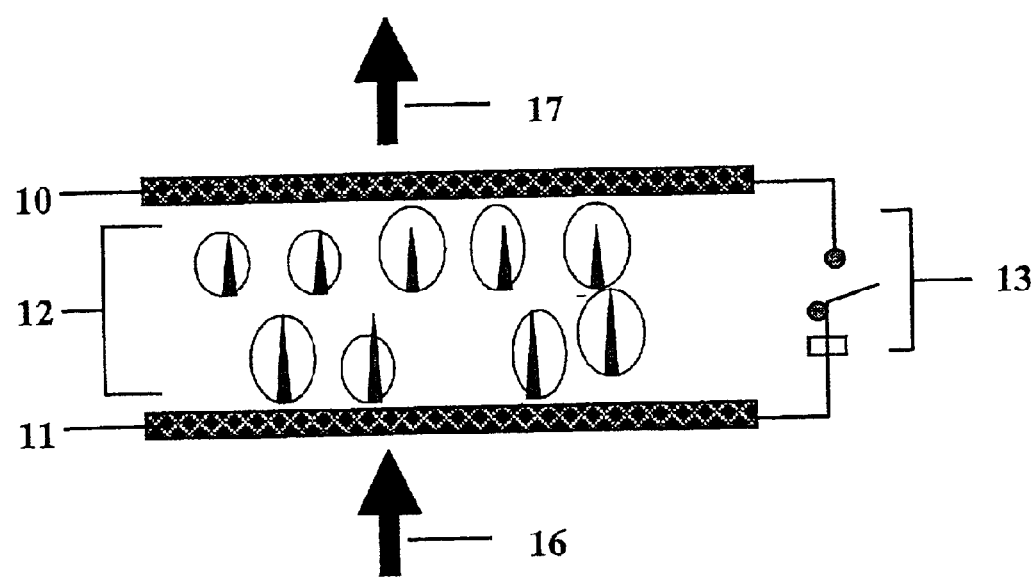

A typical PDLC display, as shown in FIG. 1a, comprises two electrode plates (10, 11), at least one of which is transparent (10), and a layer of liquid crystal domains dispersed in an isotropic polymer matrix. FIG. 1a also shows the random direction of the liquid crystal molecules when no voltage (13) is imposed on the two electric plates (10, 11). The incoming light (14) is thus scattered (15) by the random orientation of the liquid crystal molecules FIG. 1b shows that the liquid crystal molecules are lined up in a certain direction when voltage (13) is imposed on the two electric plates. Incoming light (16) thus is transmitted through (17) because the ordinary refractive index of the liquid crystal is matched to the isotropic refractive index of the polymer matrix (12).

Figure 1C:
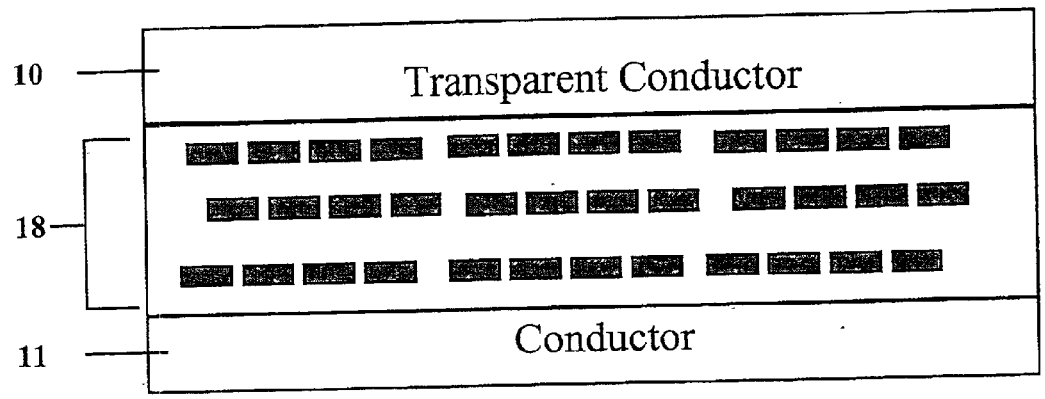
FIGS. 1c, 1d and 1e are schematic depictions of the LC displays of the present invention.
Figure 1D:
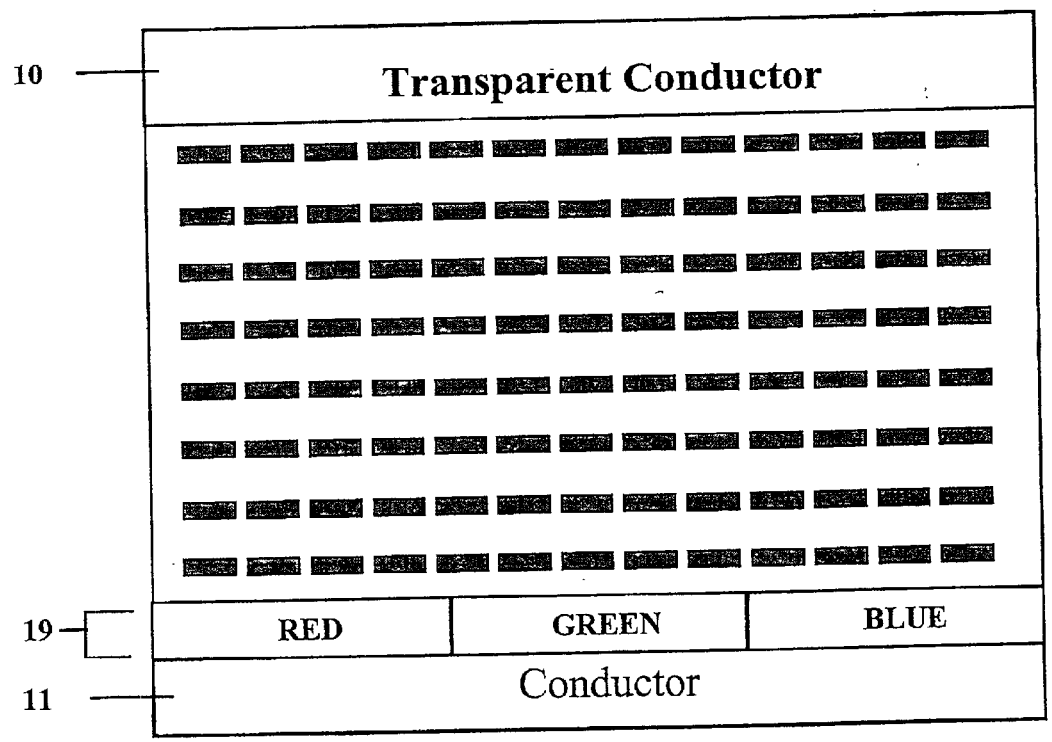

A monochrome liquid crystal display of the present invention, schematically shown in FIG. 1c comprises well-defined cells (18) enclosed between the two electrodes (10, 11). The cells (18) are of substantially uniform shape and size and are filled with a LC composition. The electrode on the viewer's side is transparent and at least one of the two electrodes is patterned. A full range of color is obtained if three primary color filters (19), such as red (R), green (G), and blue (B), are used (FIG. 1d).

Figure 1E:
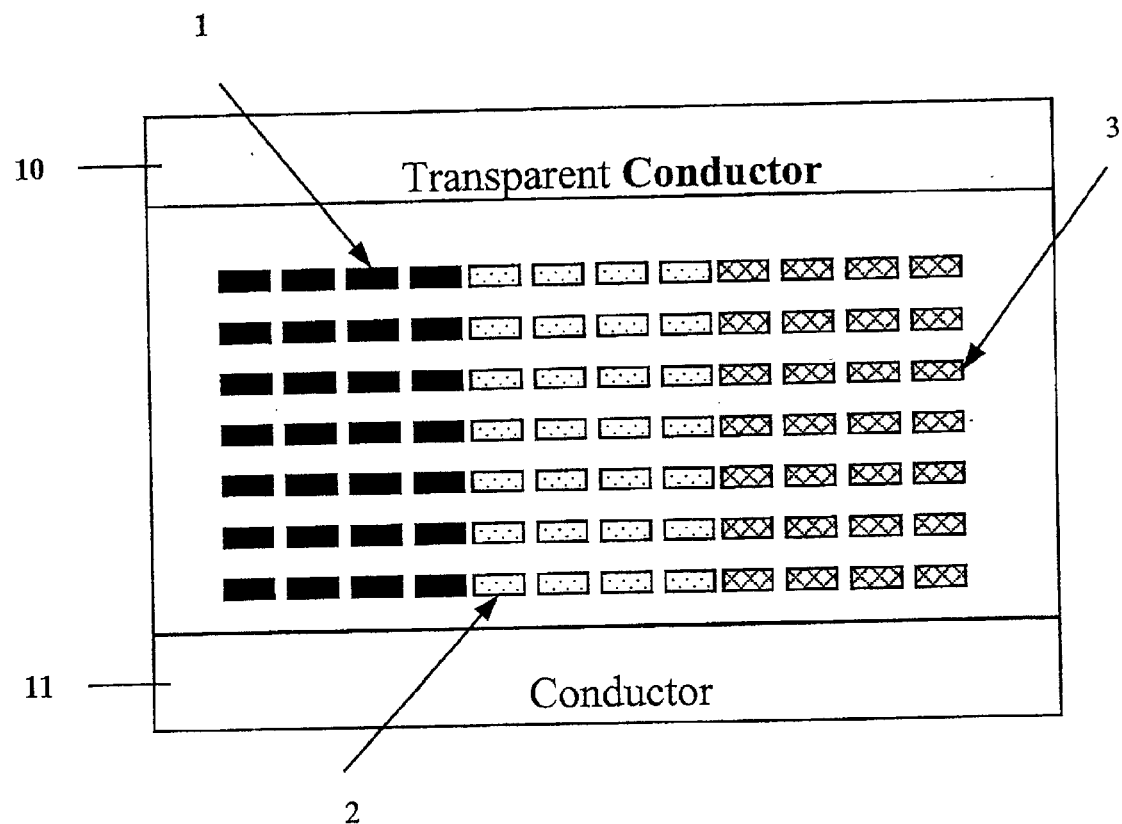

Alternatively, a full color display of the present invention may be obtained by filling the well-defined cells (1, 2 and 3) with a LC composition containing R, G, and B guest dyes, preferably dichroic dyes respectively. For example, the cells (1) are filled with LC with a red guest dye, adjacent cells (2) are filled with LC with a green guest dye, and adjacent cells (3) are filled with LC with a blue guest dye. The number of layers of the cells containing LC may be more than one (FIG. 1e).

The process for the preparation of such LC displays involves several aspects.

I. Preparation of the Microcups (a) Preparation of the Male Mold

Figure 2A:
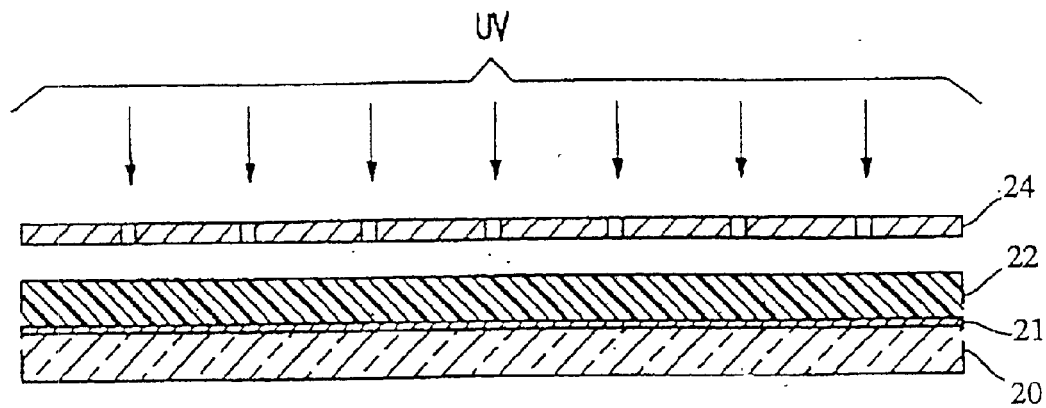
FIGS. 2a–2d illustrate a typical method of preparing the male mold for microembossing.
Figure 2B:
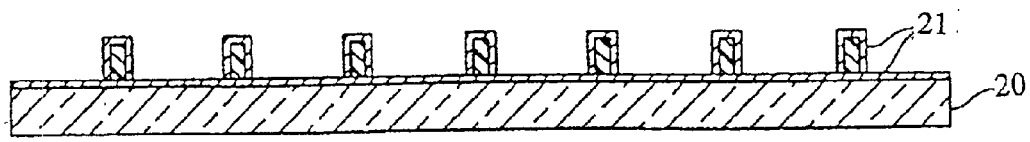
Figure 2C:
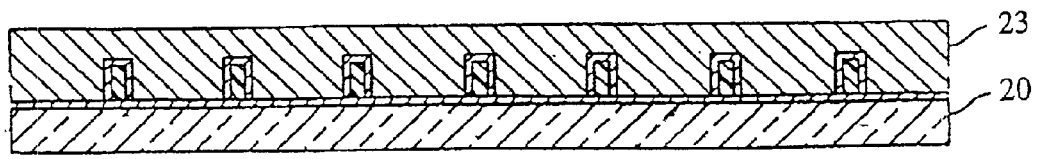
Figure 2D:
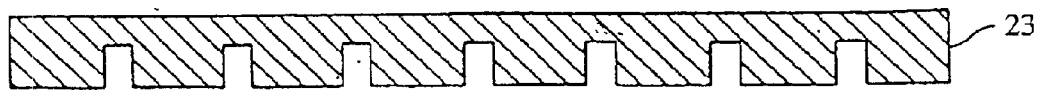

The male mold may be prepared by a photoresist process followed by either etching or electroplating. A representative example for the preparation of the male mold is given in FIGS. 2a–2d. With electroplating (FIG. 2a), a glass base (20) is sputtered with a thin layer (typically 3000 Å) of a seed metal (21) such as chrome inconel. It is then coated with a layer of photoresist (22) and exposed to UV. A mask (24) is placed between the UV and the layer of photoresist (22). The exposed areas of the photoresist become hardened. The unexposed areas are then removed by washing them with an appropriate solvent. The remaining hardened photoresist is dried and sputtered again with a thin layer of seed metal. A master (FIG. 2b) is then ready for electroforming. A typical material used for electroforming is nickel cobalt (23). Alternatively, the master can be made of nickel by nickel sulfamate electroforming or electrodless nickel deposition as described in "Continuous manufacturing of thin cover sheet optical media", SPIE Proc. Vol. 1663, p. 324 (1992). The floor of the mold (FIG. 2d) is typically between 1 to 5 microns. The master can also be made using other microengineering techniques including e-beam writing, dry etching, chemical etching, laser writing or laser interference as described in "Replication techniques for micro-optics", SPIE Proc. Vol. 3099, pp. 76–82 (1997). Alternatively, the mold can be made by photomachining using plastics, ceramics or metals.

(b) Preparation of the Microcups by Embossing

Figure 3A:
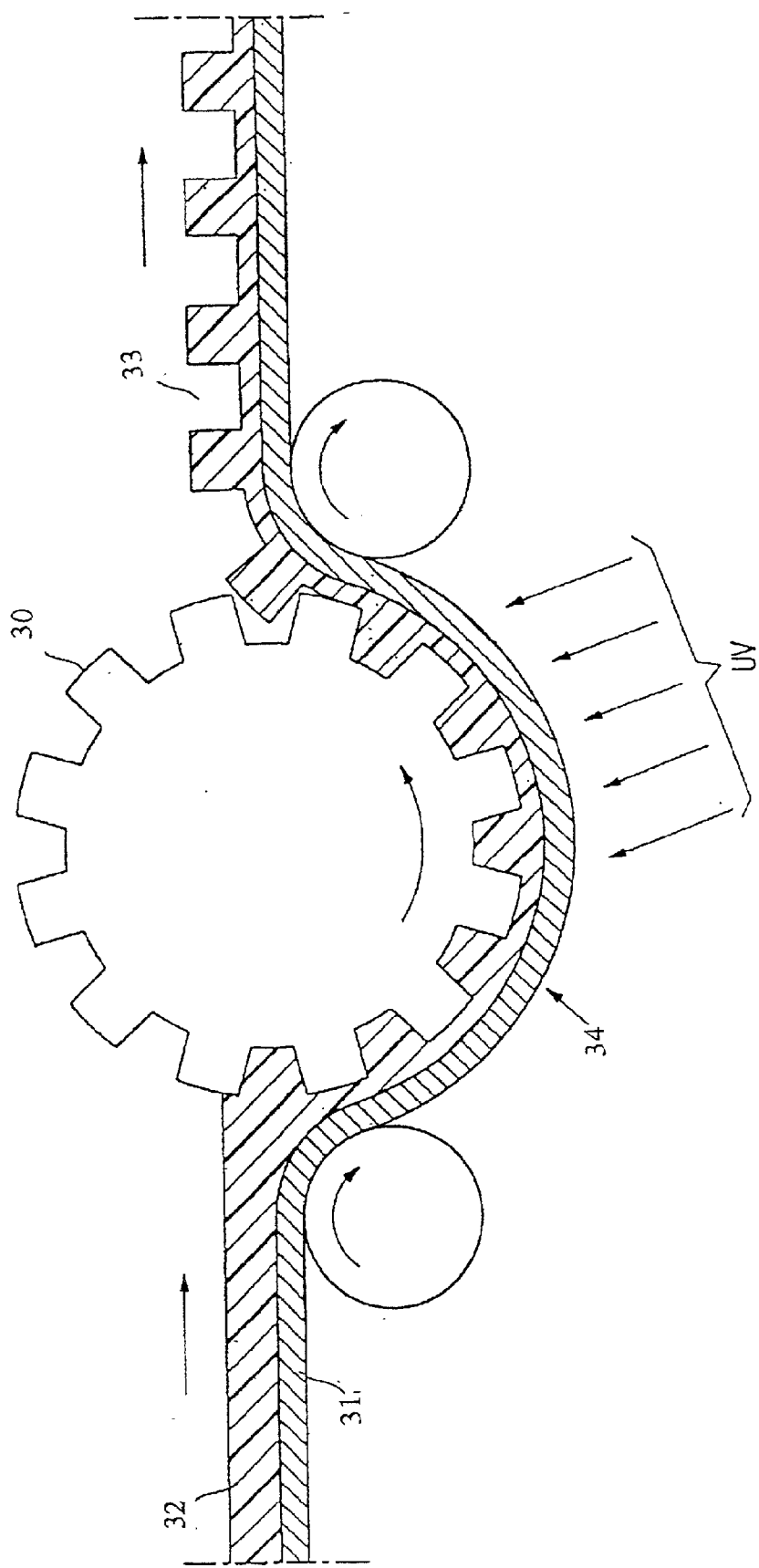
FIGS. 3a–3b show the roll to roll process for the manufacture of a LCD, in particular, the creation of microcups by embossing a conductor film coated with a UV curable composition.
Figure 3B:
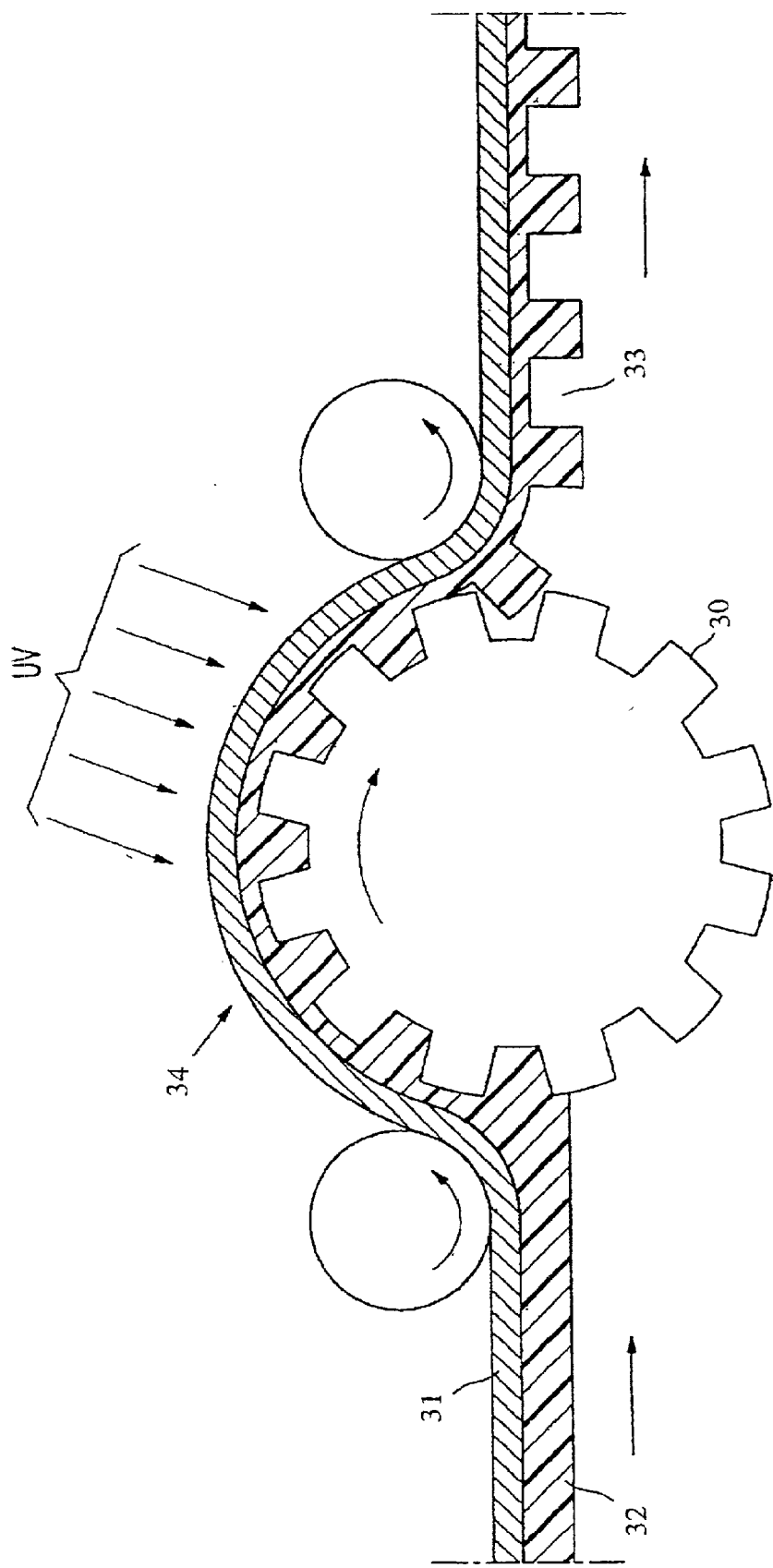

This processing step is shown in FIGS. 3a and 3b. The male mold (30) may be placed either above (FIG. 3a) or below (FIG. 3b) the web (34). The transparent conductive substrate is constructed by forming a transparent conductor film (31) on a glass plate or a plastic substrate. A layer of a thermoplastic or thermoset precursor (32) is then coated on the conductor film. The thermoplastic or thermoset precursor layer is embossed at a temperature higher than the glass transition temperature of the thermoplastic or thermoset precursor layer by the male mold in the form of a roller, plate or belt.

The thermoplastic or thermoset precursor (32) for the preparation of the microcups (33) may be multifunctional acrylate or methacrylate, vinyl ether, epoxide and their oligomers, polymers and the like. Multifunctional acrylate and its oligomers are the most preferred. A combination of multifunctional epoxide and multifunctional acrylate is also very useful to achieve desirable physico-mechanical properties. A crosslinkable oligomer imparting flexibility, such as urethane acrylate or polyester acrylate, is usually also added to improve the flexure resistance of the embossed microcups. The composition may contain polymer, oligomer, monomer and additives or only oligomer, monomer and additives. The glass transition temperatures (or Tg) for this class of materials usually range from about −70° C. to about 150° C., preferably from about −20° C. to about 50° C. The microembossing process is typically carried out at a temperature higher than the Tg. A heated male mold or a heated housing substrate against which the mold presses may be used to control the microembossing temperature and pressure.

As shown in FIGS. 3a and 3b, the mold is released during or after the precursor layer is hardened to reveal an array of microcups (33). The hardening of the precursor layer may be accomplished by cooling, cross-linking by radiation, heat or moisture. If the curing of the thermoset precursor is accomplished by UV radiation, UV may radiate onto the transparent conductor film from the bottom or the top of the web (34) as shown in the two figures. Alternatively, UV lamps may be placed inside the mold. In this case, the mold must be transparent to allow the UV light to radiate through the pre-patterned male mold on to the thermoset precursor layer.

Figure 4A:
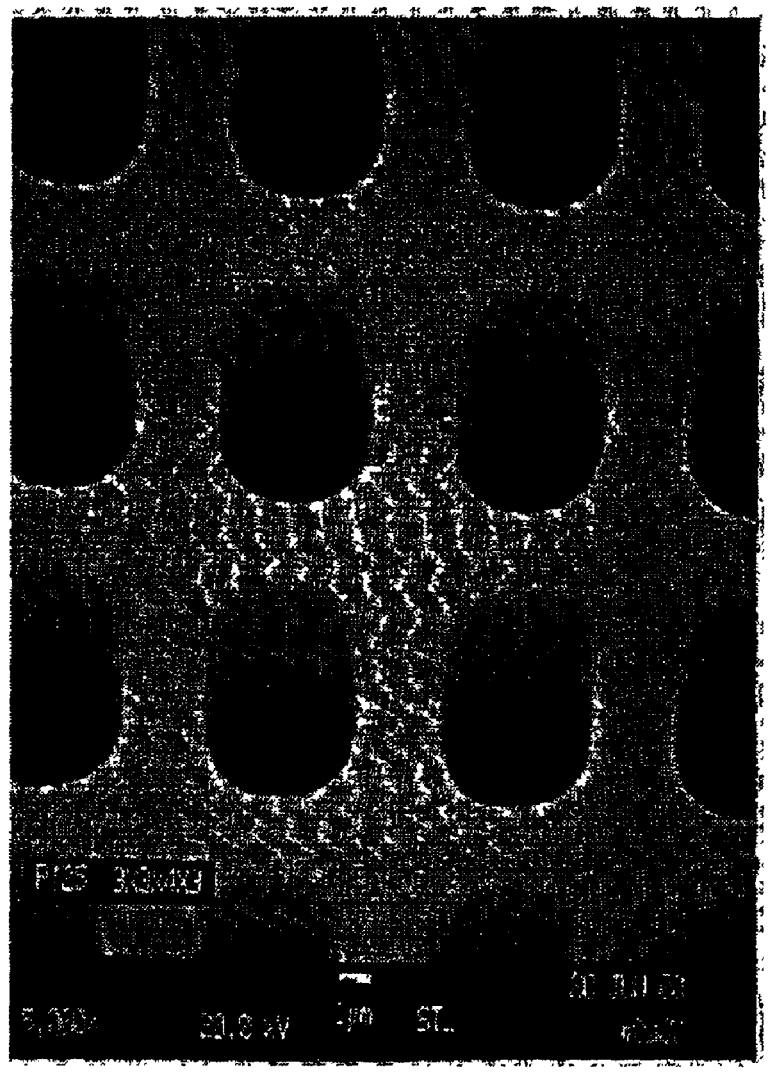
FIGS. 4a–4b show two SEM micrographs of microcup arrays prepared by microembossing.
Figure 4B:
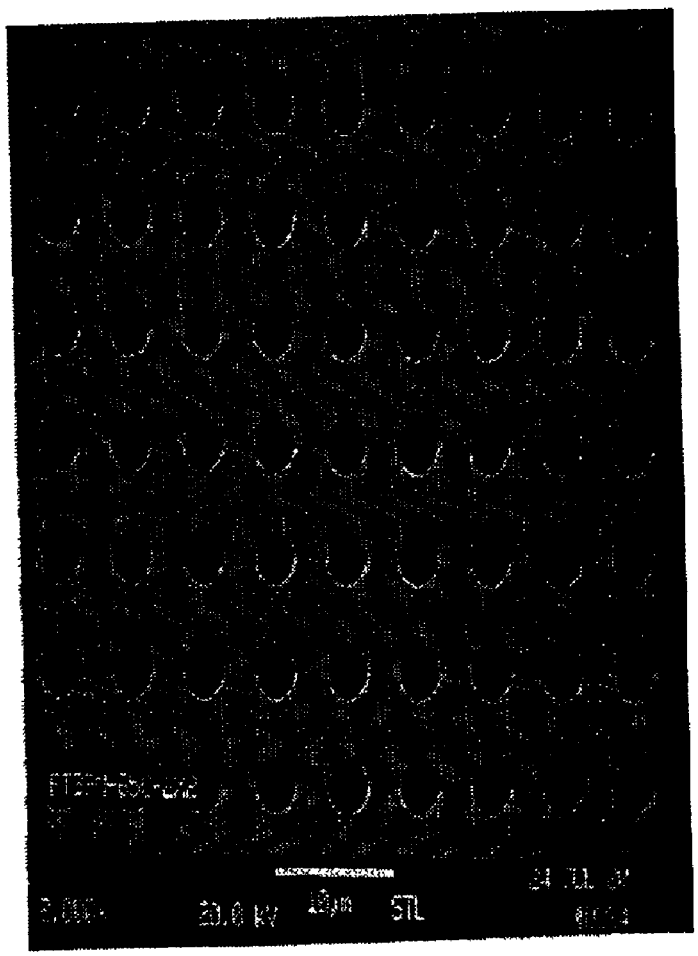
Figure 6A:
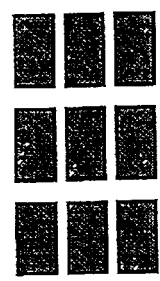
FIGS. 6a–6f show examples of different shapes and patterns of microcup arrays.
Figure 6B:
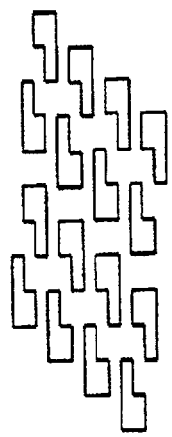
Figure 6C:
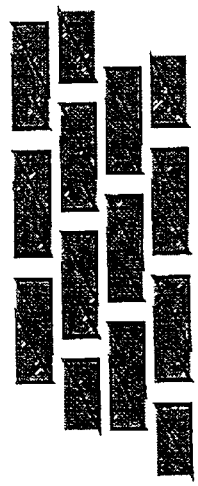
Figure 6D:
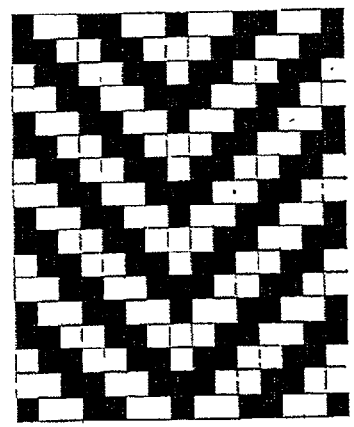
Figure 6E:
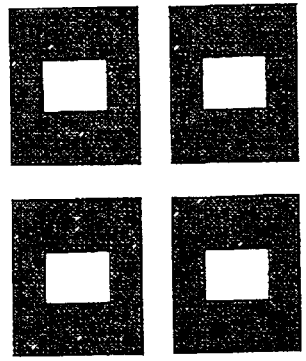
Figure 6F:
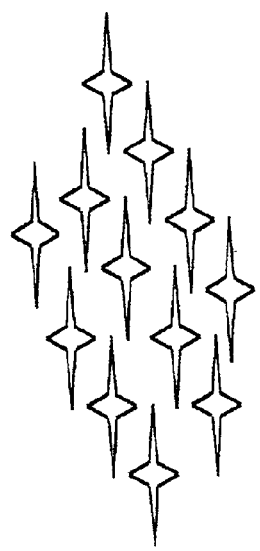

FIGS. 4a and 4b show SEM micrographs of two microcup arrays prepared by microembossing.

(c) Preparation of the Microcups by Imagewise Exposure

Alternatively, the microcups may be prepared by imagewise exposure (FIG. 5a) of a radiation curable material (51) coated on the conductor film (52) to UV or other forms of radiation through a mask (50). The conductor film (52) is on a plastic substrate (53).

For a roll-to-roll process, the photomask may be synchronized with the web and move at the same speed as the latter. In the photomask (50) in FIG. 5a, the dark squares (54) represent the opaque area and the space (55) between the dark squares represents the opening area. The UV radiates through the opening area (55) onto the radiation curable material. The exposed areas become hardened and the unexposed areas (protected by the opaque area in the mask) are then removed by an appropriate solvent or developer to form the microcups (56). The solvent or developer is selected from those commonly used for dissolving or dispersing the radiation curable materials such as methylethylketone, toluene, acetone, isopropanol or the like.

FIGS. 5b and 5c illustrate two other options for the preparation of microcups by imagewise exposure. The features in these two figures are essentially the same as shown in FIG. 5a and the corresponding parts are also numbered the same. In FIG. 5b, the conductor film (52) used is opaque and pre-patterned. In this case, it may be advantageous to imagewise expose the radiation sensitive material through the conductor pattern, which serves as the photomask. The microcups (56) can then be formed by removing the unexposed areas after UV radiation. In FIG. 5c, the conductor film (52) is also opaque and line-patterned. The radiation curable material is exposed from the bottom through the conductor line pattern (52), which serves as the first photomask. A second exposure is performed from the other side through the second photomask (50) having a line pattern perpendicular to the conductor lines. The unexposed area is then removed by a solvent or developer to reveal the microcups (56).

In general, the microcups (56) can be of any shape to maximize the light scattering effect of the liquid crystal domains. The microcups are of substantially uniform size and shape in one system. However, microcups having different shapes and sizes may be used for different colors. For example, microcups filled with LC with a red guest dye may have a different shape or size from the green microcups or the blue microcups. Furthermore, a pixel may consist of different numbers of microcups of different colors. Also, a pixel may consist of a number of small green microcups, a number of large red microcups, and a number of small blue microcups. It is not necessary to have the same shape and number for the three colors. FIGS. 6a–6f illustrate six examples of microcup patterns that may be used in the present invention.

The openings of the microcups may be round, square, rectangular, hexagonal, or any other shape. The partition area between the openings is preferably kept small in order to achieve a high color saturation and contrast ratio while maintaining desirable mechanical properties.

For LC displays of the present invention, the dimension of each individual microcup may be in the range of about 0.04 to about 100 $\mu$m, preferably from about 0.6 $\mu$m to about 36 $\mu$m. The depth of the microcups is in the range of about 1 to about 10 microns, preferably from about 2 to about 6 microns. The opening to wall ratio is in the range of from about 0.05 to about 20, preferably from about 0.2 to about 10. The distances of the openings usually are in the range of about 0.5 to about 6 microns preferably from about 1 to about 4 microns from edge to edge of the openings II. Liquid Crystals, Dichroic Dyes and Their Mixtures The thus-formed array of microcups is filled with liquid crystals, usually by a coating process. Liquid crystals may also contain a dichroic dye to impart a monochrome color to the display and to increase the contrast.

Liquid crystal materials that may be used in the present invention are well known in the art. Examples of liquid crystal materials that may be used in the present invention include, but not limited to, E7, TL205, TL213, BL006, BL009 and BL037 from E. Merck Co. (Germany). Other liquid crystal materials are also listed in U.S. Pat. No. 5,835,174 (Clikeman, et al.). Cholesteric liquid crystals may also be used in some applications.

Liquid crystals in the present invention are preferred to contain guest dye(s). Guest dyes of the present invention are dichroic and are well known in the art. See U.S. Pat. No. 5,589,100 (Grasso, et al) stating that arylazo or poly (arylazo) dichroic dyes may be used with liquid crystal as well as listing other dichroic dyes suitable for the present invention.

The incorporation of dyes not only adds color but also can substantially improve contrast in some display applications. To be suitable, dyes must have high order parameters and proper solubility in the host liquid crystal material. High order parameter is promoted by dyes with elongated shape having a large ratio of molecular length to width, similar to the shape of the molecules of liquid crystal host material. The LC with guest dye(s) should provide good viewing characteristics, such as high contrast, high extinction, and chemical and photochemical stability. Example of dichroic dyes having a high dichroic ratio used in the present invention include the Blue AB2, Red AR1 and Yellow AG1 from Funktionfluid Gmb (Germany) and SI-486 (yellow), SI426 (red), M483 (blue), S344 (black), S428 (black) and S7 (black) from Mitsui Toatsu.

Nonionic azo and anthraquinone dyes are also useful. Examples include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthroquinone blue, anthroquinone yellow 114, anthroquinone red 111, 135, anthroquinone green 28 from Aldrich. In any case, the dye must be chemically stable and should have a low solubility in the microcup material. Liquid crystals or dyes should not at any time attack the microcups.

III. Sealing of the Microcups

The sealing of the microcups may be accomplished in a number of ways. A preferred approach is to disperse a UV curable sealant composition into the LC composition. The UV curable composition is immiscible with and has a specific gravity lower than that of the LC. The UV curable composition and the LC composition, are thoroughly blended in an in-line mixer and immediately coated onto the microcups with a precision coating mechanism such as Myrad bar, gravure, doctor blade, slot coating or slit coating. Volatile solvents may be used to control the viscosity, the coverage of the coating, and facilitate the phase separation of the sealant phase from the LC phase. Excess fluid may be scraped away by a wiper blade or a similar device. The thus-filled microcups are then dried and the UV curable composition floats to the top of the LC. The microcups may be sealed by curing the supernatant UV curable layer during or after it floats to the top. UV or other forms of radiation such as visible light, IR and electron beam may be used to cure and seal the microcups. Alternatively, heat or moisture, or the combination may also be employed to cure and seal the microcups, when heat or moisture curable sealant compositions are used.

Surfactants may be used to improve the adhesion of the sealant to the microcup wall and the wetting at the interface between the LC and the sealing materials. Useful surfactants include the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives, and Silwet surfactants from OSi.

Alternatively, the LC and the sealant composition may be coated sequentially into the microcups. Thus, the sealing of the microcups may be accomplished by overcoating a thin layer of a thermoplastic or a thermoset precursor composition which is curable by radiation, heat, moisture or interfacial reactions and curing on the surface of the filled microcups. Interfacial polymerization followed by UV curing is very beneficial to the sealing process. Intermixing between the LC layer and the overcoat can be significantly suppressed by the formation of a thin barrier layer at the interface by interfacial polymerization. The sealing is then completed by a post curing step, preferably by UV radiation. To further reduce the degree of intermixing, it is highly desirable that the specific gravity of the overcoating is lower than that of the LC. Volatile organic solvents may be used to adjust the viscosity and the thickness of the coatings. When a volatile solvent is used in the overcoat, it is preferred that it is immiscible with the LC or the dye and has a specific gravity lower than that of the LC phase. The two-step overcoating process is particularly useful when the dye used is at least partially soluble in the sealant layer. To further reduce the degree of intermixing between the sealant layer and the LC phase, the filled microcup array may be chilled before overcoating of the sealant layer.

Alternatively, sealing of the filled microcups may be achieved by transfer laminating an adhesive layer from a release substrate onto the filled microcups, preferably followed by hardening the adhesive layer by heat, radiation or by simple solvent evaporation, and finally peeling off the release substrate. Chilling of the filled microcups is also beneficial to the sealing by transfer lamination process.

IV. Preparation of Monochrome LC displays

Figure 7:
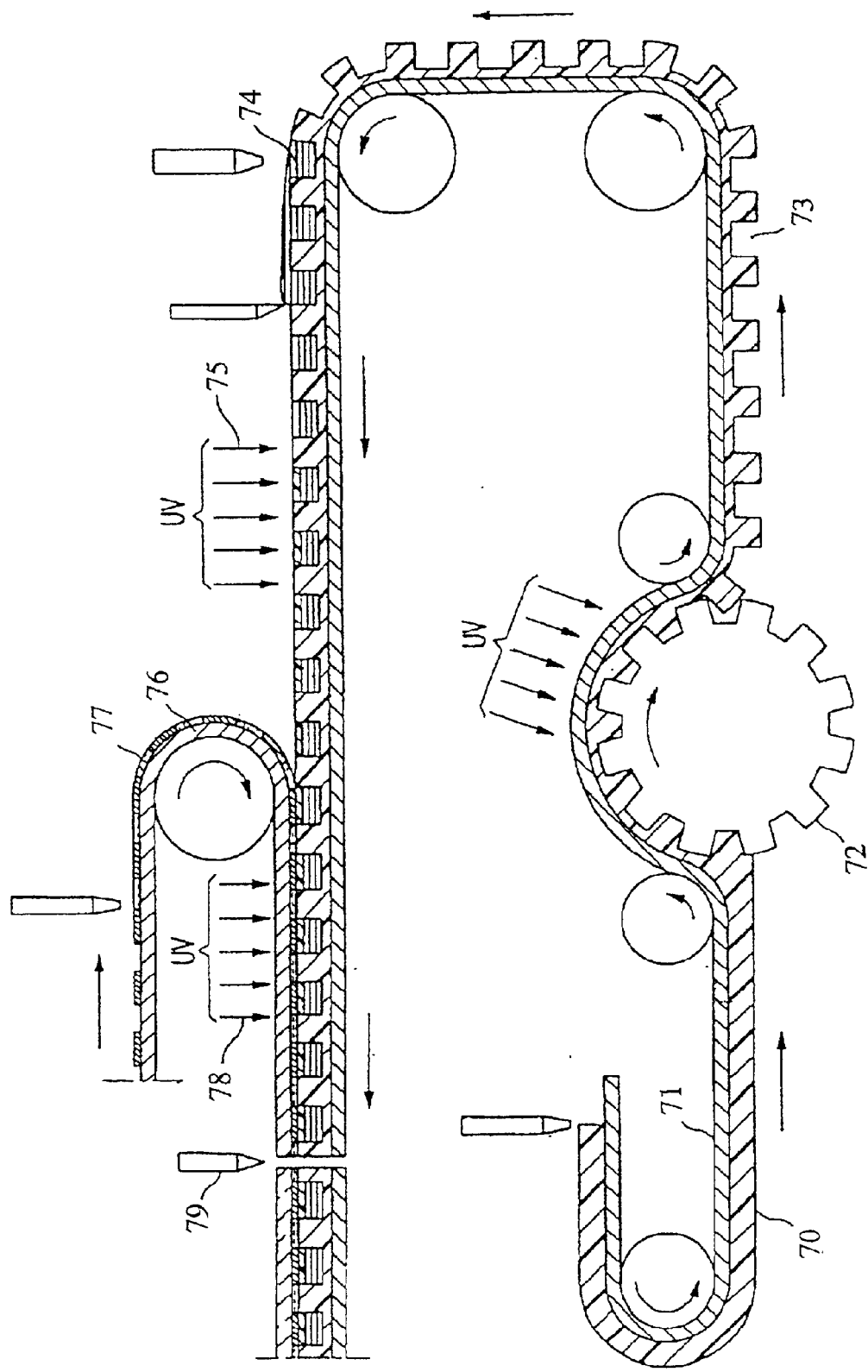
FIG. 7 is a flow chart for manufacturing a monochrome LCD.

The process is illustrated by the flow diagram as shown in FIG. 7. All microcups are filled with LC containing the same color guest dye(s). The process can be a continuous roll-to-roll process comprising the following steps:

1. Coat a layer of thermoplastic or thermoset precursor (70) optionally with a solvent onto a transparent conductor film (71). The solvent, if present, readily evaporates.
2. Emboss the thermoplastic or thermoset precursor layer at a temperature higher than the glass transition temperature of the thermoset precursor layer by a pre-patterned male mold (72).
3. Release the mold from the thermoplastic or thermoset precursor layer preferably during or after it is hardened by proper means.
4. Fill in the thus-formed array of microcups (73) with a LC composition (74) containing a thermoset precursor composition, which is incompatible with the LC and has a lower specific gravity than the LC phase.
5. Seal the microcups by hardening the thermoset precursor preferably by solvent evaporation, radiation such as UV (75), or by heat or moisture during or after the thermoset precursor separates and forms a supernatant layer on top of the LC phase, thus forming closed LC cells containing LC and preferably guest dye(s).
6. Laminate the sealed array of LC cells with a second conductor film (76) pre-coated with an adhesive layer (77) which may be a pressure sensitive adhesive, a hot melt adhesive, a heat, moisture, or radiation curable adhesive.

The laminate adhesive may be hardened by heat or radiation such as UV (78) through the top conductor film if the latter is transparent to the radiation. The laminated product may be cut (79) to appropriate size for device assembling.

The preparation of the microcups described above can be conveniently replaced by the alternative procedure of imagewise exposing the conductor film coated with a thermoset precursor followed by removing the unexposed areas by an appropriate solvent. The sealing of the microcups may alternatively be accomplished by the overcoating or transfer lamination processes described previously, followed by hardening the sealant over the surface of the filled microcups.

To improve the contrast ratio, more than a layer of the microcup array can be used (FIG. 1c). Thus, after hardening the sealant layer on the filled microcups (the Step 5), another layer of microcup forming composition is coated onto the sealed microcup array. The Steps 2–5 can be repeated several times until an appropriate contrast ratio is achieved. The multilayer microcup stack is then laminated with a second conductor layer, and cut to appropriate size for display assembly. It is important to note that at least one of the two conductor films is prepatterned. Also at least the conductor film at the viewer's side is transparent.

V. Preparation of Multi-Color LC displays

A multi-color LC display of the present invention can be prepared by using (R, G, B) color filters and a black matrix underneath the monochrome display prepared in the previous section (FIG. 1d). Alternatively a full color display of the present invention can be prepared by filling microcups with LC containing guest dye(s) of different colors (FIG. 1e). In addition to processes described in the preparation of monochrome displays, additional steps are required for such a color display. These additional steps include (1) laminating the already formed microcups with a positively working dry-film photoresist consisting of at least a removable support such as PET-4851 from Saint-Gobain, Worcester, Mass., a novolac positive photoresist such as Microposit S1818 from Shipley, and an alkali-developable adhesive layer such as a mixture of Nacor 72-8685 from National Starch and Carboset 515 from BF Goodrich; (2) selectively opening a certain amount of the microcups by imagewise exposing the photoresist, removing the removable support film, and developing the positive photoresist with a developer such as diluted Microposit 351 developer from Shipley; (3) filling the opened cups with the LC with guest dye(s) of the first primary color; and (4) sealing the filled microcups as described in the preparation of monochrome displays. These additional steps may be repeated to create microcups filled with LC of the second and the third primary colors.

More specifically, a multi-color LC display may be prepared according to the steps as shown in FIG. 8:

1. Coat a layer of thermoplastic or thermoset precursor (80) on a conductor film (81).
2. Emboss the thermoplastic or thermoset precursor layer at a temperature higher than its glass transition temperature by a pre-patterned male mold (not shown).

3. Release the mold from the thermoplastic or thermoset precursor layer preferably during or after it is hardened by solvent evaporation, cooling, or crosslinking by radiation, heat or moisture.
4. Laminate the thus formed array of microcups (82) with a positive dry-film photoresist, which comprises at least a positive photoresist (84) and a removable plastic cover sheet (not shown). The positive dry film photoresist may comprise an adhesive layer (83) to improve the adhesion between the microcups and the resist.
5. Imagewise expose (FIG. 8c) the positive photoresist by UV, visible light, or other radiation, remove the cover sheet, develop and open cups in the exposed area. The purpose of Steps 4 and 5 is to selectively open the microcups in a predetermined area (FIG. 8d).
6. Fill in the opened microcups with a LC composition containing guest dye(s) (85) of the first primary color and a sealant composition (86), which is incompatible with the LC phase and has a lower specific gravity than the LC phase.
7. Seal the microcups to form closed LC cells containing LC with guest dye(s) of the first primary color by hardening the sealant layer by solvent evaporation or curing preferably by radiation such as UV, less preferably by heat or moisture during or after the sealant separates and forms a supernatant layer on top of the liquid crystal phase (FIG. 8e).
8. Steps 5–7 described above may be repeated to generate well-defined cells containing LC with guest dye(s) of different colors in different areas (FIGS. 8e, 8f and 8g).
9. Laminate the sealed array of LC cells to a second transparent conductor film (87) pre-coated with an adhesive layer (88) which may be a pressure sensitive adhesive, a hot melt adhesive, a heat, moisture, or radiation curable adhesive.
10. Harden the adhesive.

The preparation of the microcups described in the process above can conveniently be replaced by the alternative procedure of imagewise exposing the conductor film coated with a thermoset precursor followed by removing the unexposed areas by an appropriate solvent. The sealing of the microcups may be alternatively accomplished by directly coating a layer of the thermoset precursor material over the surface of the liquid phase.

The thickness of the display produced by the present processes as described can be as thin as a piece of paper. The width of the display is the width of the coating web (typically 3–90 inches). The length of the display can be anywhere from inches to thousands of feet depending on the size of the roll.

EXAMPLES

The following examples are given to enable those skilled in the art to more clearly understand and to practice the present invention. They should not be considered as limiting the scope of the invention, but merely as being illustrative and representative thereof.

Example 1

Preparation of Microcups by Microembossing

The composition shown in Table 1 was coated with a Myrad bar #6 coated onto a 2mil PET film precoated with an ITO conductor layer from Sheldahl (Northfield, Minn.). A pre-patterned (4×4×4 microns) cobalt nickel male mold and a mold release Frekote 700-NC from Henkel were used for microembossing. The coating thickness was controlled to be about 5 microns. The coated film was then embossed by the stencil using a pressure roller at 90° C. The coating was then UV-cured for about 1 minute through the Mylar film using a Cure Zone exposure unit (ADAC Technologies) equipped with a metal fluoride lamp with an intensity of 80 mW/cm$^2$ at 365 nm. The embossed film was then released from the mold to reveal well-defined (4×4×4 microns) microcups. The microembossing was carried out using the GBC Laminator at 90° C.

TABLE 1

UV-curable Acrylate Formulation for Microcups

| No. | Description | Ingredient | Supplier | Parts |
|---|---|---|---|---|
| 1 | Epoxy acrylate | Ebecryl 600 | UCB Chemicals | 55 |
| 2 | Polyester acrylate | Ebecryl 830 | UCB Chemicals | 15 |
| 3 | Urethane acrylate | Ebecryl 6700 | UCB Chemicals | 10 |
| 4 | Silicon Acrylate | Ebecryl 350 | UCB Chemicals | 5 |
| 5 | Monomer | Sartomer SR238 | Sartomer | 10 |
| 6 | Monomer | Sartomer SR306 | Sartomer | 5 |
| 7 | Monomer | Sartomer SR351 | Sartomer | 5 |
| 8 | Photoinitiator | Irgacure 500 | Ciba | 1 |
| 9 | Synergist | Methyl diethanol amine | Aldrich | 0.5 |
| 10 | Solvent | MEK | Aldrich | 100 |

Example 2

Preparation of Microcups by Microembossing

The same as Example 1 except the formulation shown in Table 2 was coated embossed with a male mold of 4×4×4 microns.

TABLE 2

UV-curable Acrylate Formulation for Microcups

| No. | Description | Ingredient | Supplier | Parts |
|---|---|---|---|---|
| 1 | Epoxy acrylate | Ebecryl 600 | UCB Chemicals | 50 |
| 2 | Polyester acrylate | Ebecryl 830 | UCB Chemicals | 15 |
| 3 | Urethane acrylate | Ebecryl 6700 | UCB Chemicals | 10 |
| 4 | Silicon acrylate | Ebecryl 350 | UCB Chemicals | 5 |
| 5 | Monomer | Poly(ethylene glycol) methacrylate | Aldrich | 5 |
| 6 | Monomer | Sartomer SR238 | Sartomer | 5 |
| 7 | Monomer | Sartomer SR306 | Sartomer | 5 |
| 8 | Monomer | Sartomer SR351 | Sartomer | 5 |
| 9 | Photoinitiator | Irgacure 907 | Ciba | 0.5 |
| 10 | Solvent | MEK | Aldrich | 300 |

A Myrad bar #12 was used. The controlled thickness was 5 microns. The microembossing was carried out using a pressure roller (GBC Laminator) heated at 90° C.

Example 3

Preparation of Microcups by Microembossing

The composition shown in Table 3 was laminated using a pressure roller between a 2 ml PET film precoated with an ITO conductor layer, and a pre-patterned (4×4×4 microns) cobalt nickel mold. The PET/ITO film was treated with a corona discharge (Electro-Technic Products, Model BD-10A, Chicago, Ill.) for 5 sec. The cobalt nickel mold was pretreated with a mold release Frekote 750-NC. The coating was then UV cured for 1 mm through the PET/ITO film. The embossing film was then released from the mold to reveal well-defined (4×4×4 microns) microcups with a thickness of 5.5 microns as measured by a Mituyoto thickness gauge.

TABLE 3

UV-curable Acrylate Formulation for Microcups

| No. | Description | Ingredient | Supplier | Parts |
|---|---|---|---|---|
| 1 | Epoxy acrylate | Ebecryl 600 | UCB Chemicals | 40 |
| 2 | Polyester acrylate | Ebecryl 830 | UCB Chemicals | 15 |
| 3 | Urethane acrylate | Ebecryl 6700 | UCB Chemicals | 10 |
| 4 | Silicon acrylate | Ebecryl 350 | UCB Chemicals | 5 |
| 5 | Monomer | Poly(ethylene glycol) methacrylate | Aldrich | 15 |
| 6 | Monomer | Sartomer SR238 | Sartomer | 5 |
| 7 | Monomer | Sartomer SR306 | Sartomer | 5 |
| 8 | Monomer | Sartomer SR351 | Sartomer | 5 |
| 9 | Photoinitiator | Irgacure 907 | Ciba | 0.5 |

Example 4

Preparation of Filled Microcups with Liquid Crystal Solution

The microcups generated in Example 3 were washed with hexanes, then with MEK, and oven dried (66° C.) for 10 min. A liquid crystal BL006 (E. Merck Co., Germany) solution containing 1 wt % Silwet L7608 (OSi Specialties) was mixed with 9 times volume of MPK, and the resulting solution was coated on microcup using Myrad bar #16. Excess solvent in the microcup was evaporated in oven (66° C.) for 10 min.

Example 5

Preparation of Filled Microcups with Liquid Crystal Solution Containing Blue Dichroic Dye The microcups generated in Example 3 were washed with hexanes, then with MEK, and oven dried (66° C.) for 10 min. A liquid crystal BL006 (E. Merck Co., Germany) solution containing 3 wt % dichroic dye Blue AB2 (Funktionfluid Gmb, Germany) and 1 wt % Silwet L7608 (OSi Specialties) was mixed with 9 times volume of MPK, and the resulting solution was coated on microcup using Myrad bar #16. Excess solvent on the microcup was evaporated in oven (66° C.) for 10 min.

Example 6

Preparation of Filled Microcups with Liquid Crystal Solution Containing Black Dichroic Dye Mixture The microcups generated in Example 3 were washed with hexanes, then with MEK, and oven dried (66° C.) for 10 mm. A black dichroic dye mixture was prepared by mixing three dichroic dyes, Blue AB2, Red AR1, and Yellow AG1 (Funktionfluid Gmb, Germany), together. A liquid crystal BL006 (E. Merck Co., Germany) solution containing 2wt % black dichroic dye mixture and 1wt % Silwet L7608 (OSi Specialties) was mixed with 9 times volume of MPK, and the resulting solution was coated on microcup using Myrad bar #16. Excess solvent on the microcup was evaporated in oven (66° C.) for 10 mm.

Example 7

Sealing the Microcups by a Two-step (Overcoating) Process

A 10% solution of Vistalon 0106 (Exxon Mobil Chemicals) in Isopar E (Exxon Chemical) was coated onto a BL006-filled microcup sample prepared in Example 4, 5 or 6. The coating layer was uniform and transparent. By using a #3 Myrad bar, a sealing polymer layer with the weight coverage of 0.39 mg/in$^2$ was obtained and the thickness of the sealing polymer layer was estimated to be 0.7$\mu$. By using a #8 Myrad bar, a sealing polymer layer with the weight coverage of 0.75 mg/in$^2$ was obtained and the thickness of the sealing polymer layer was estimated to be 1.3$\mu$. The density of Vistalon 0106 was about 0.9 g/cm$^3$.

Example 8

Sealing the Microcups by a Two-step (Overcoating) Process

Following the same procedure of Example 7, the microcups were sealed by coating a 10% solution of a carboxylated acrylic copolymer, Amphomer 28-4910 (National Starch) in 2-propanol onto the BL006-filled microcups as prepared in Example 5. The coating layer is was uniform and transparent. By using a #3 Myrad bar, a sealing polymer layer with the weight coverage of 0.44 mg/in$^2$ was obtained and the thickness of the sealing polymer layer was estimated to be 0.6$\mu$. By using a #8 Myrad bar, a sealing polymer layer with the weight coverage of 1.0 mg/in$^2$ was obtained and the thickness of the sealing polymer layer was estimated to be 1.3$\mu$. The density of Amphomer 28-4910 is was about 1.2 g/cm$^3$.

Example 9

Traditional Polymerization Induced Phase Separation PDLC Display

Figure 8A:
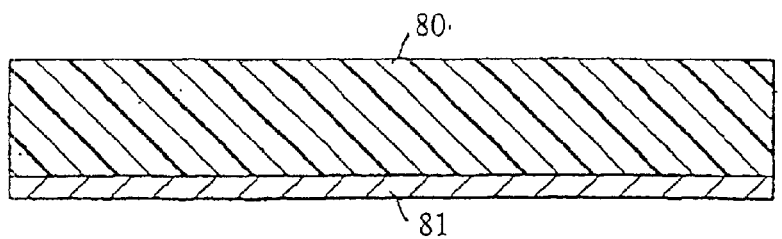
FIGS. 8a–8h show a process for the manufacturing of a full color display using three primary color guest dyes.
Figure 8B:
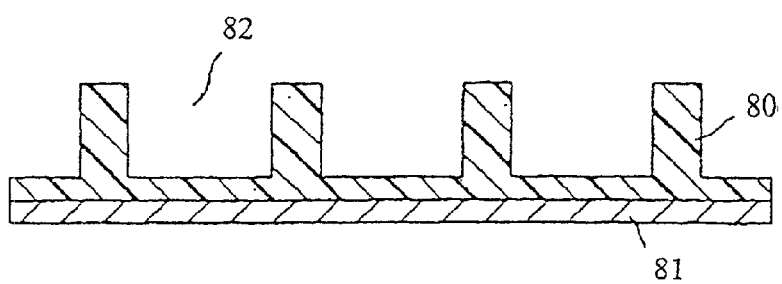
Figure 8C:
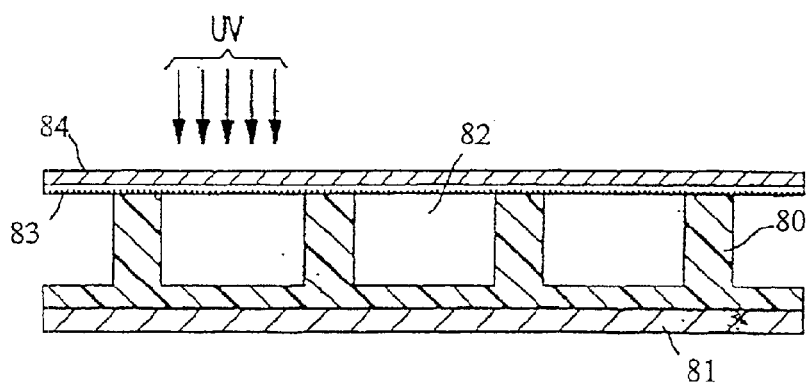
Figure 8D:
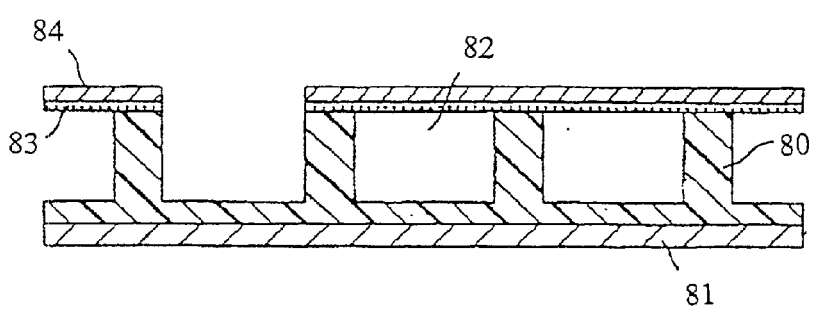
Figure 8E:
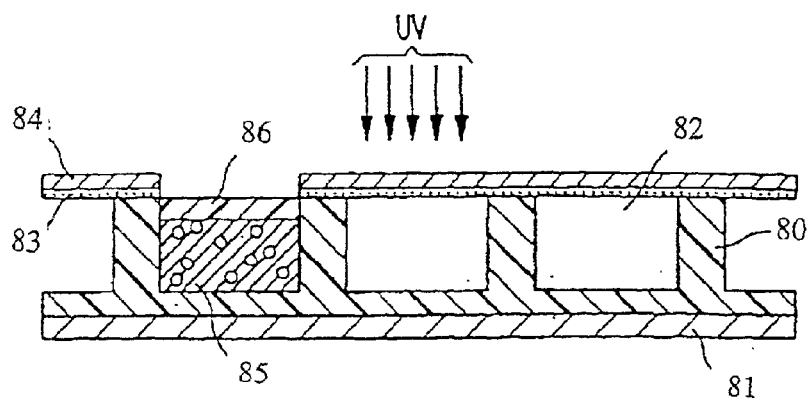
Figure 8F:
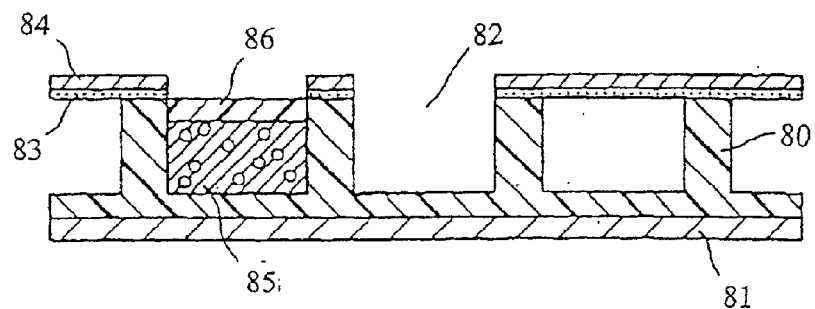
Figure 8G:
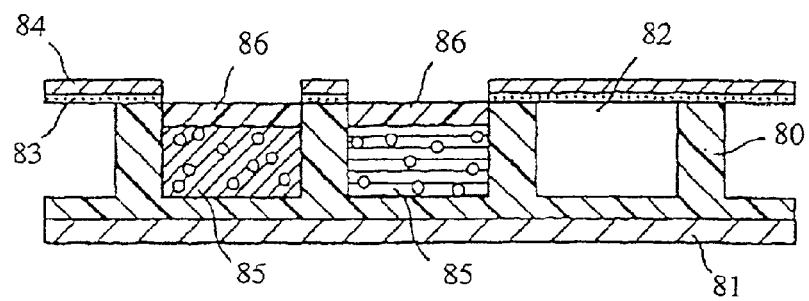
Figure 8H:
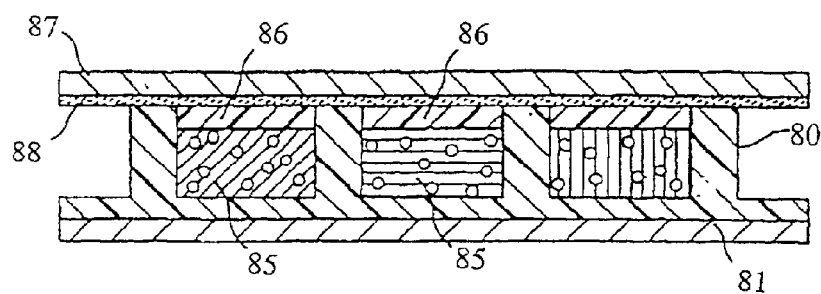
Figure 9A:
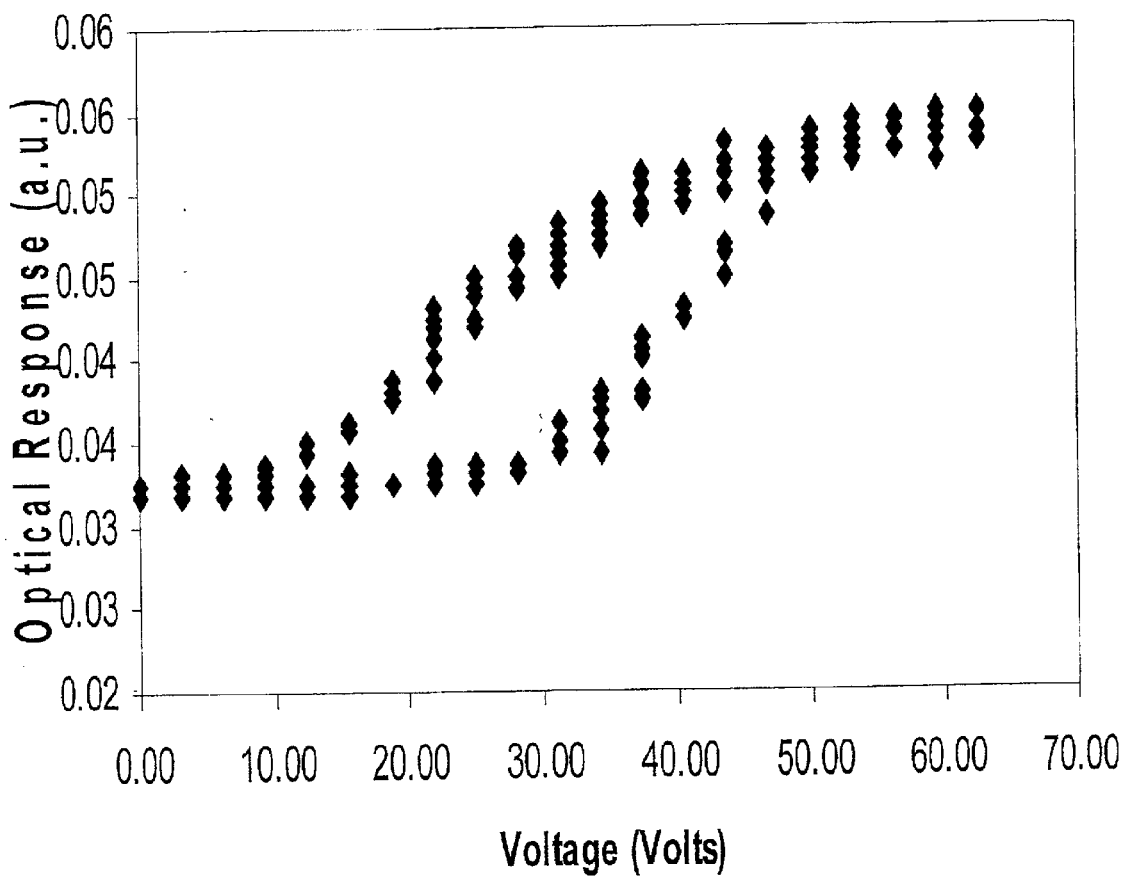
FIG. 9a shows a typical hysteresis curve for a traditional PDLC device.
Figure 9B:
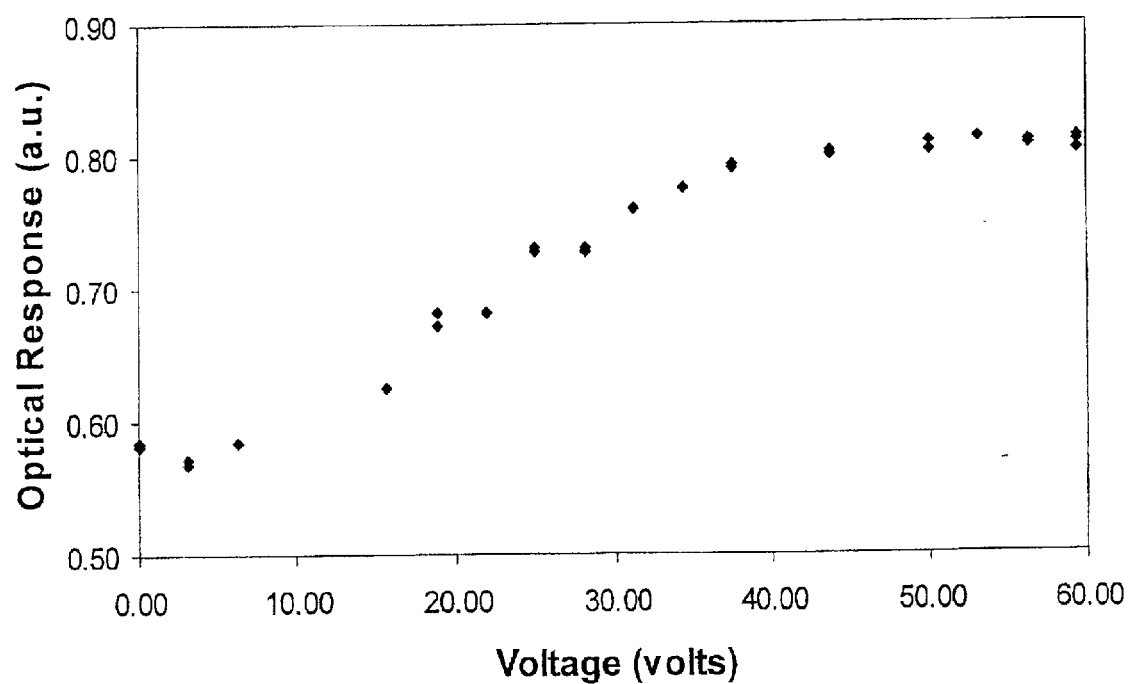
FIG. 9b shows the absence of the hysteresis loop in a typical microcup LCD of this invention.

For comparison, a traditional polymerization induced phase separation polymer disperse liquid crystal display was prepared. Different ratio of liquid crystal E7 (E. Merck, Germany) to Norland 65 (Norland) were mixed and sandwiched between two ITO coated glasses with a spacer of either 4.5 $\mu$m, 25 $\mu$m or 50 $\mu$m. Step wedge was used to optimize the UV-curing time under Cure Zone exposure unit (ADAC Technologies). FIG. 8a shows a typical hysteresis curve for polymerization induced phase separation PDLC prepared with the above procedure.

Example 10

Sipix Hysteresis-Free Liquid Crystal Display

A single layer liquid crystal display was assembled using microcup prepared in example 1, 2 or 3. Liquid crystal with or without dichroic dye(s) was filled into microcup with procedure described in example 4, 5 and or 6. These LC-filled microcups were then sealed with procedure described in example 7 or 8. No hysteresis was observed for liquid crystal displays made according to the present invention. (see FIG. 8b)

Example 11

Assembling of a multilayer display and it's performance

Multilayer liquid crystal display was assembled to improve display performance. Single layer liquid crystal display was made as described in example 10. Same procedure was used to emboss a second layer of microcup on top of the first LC display, to fill LC with or without dye and to seal the second layer of LC display. The registration of second layer microcup on the first layer was set to be off from the first layer about 0 to 10 degree to maximize light scattering. Laminate two double-layer arrays to stack up a four-layer liquid crystal display. A high contrast display was obtained with rising and falling response time of ~1 msec and ~10 msec (at 40 volts) respectively. No hysteresis loop was observed.

We claim:

1. A process for the preparation of a liquid crystal display, which process comprises the steps of:
   a) providing microcups;
   b) filling the microcups with a liquid crystal composition and a dispersion of a thermoset or thermoplastic precursor which has a specific gravity lower than that of the liquid crystal composition; and
   c) sealing the filled microcups by hardening the thermoset or thermoplastic precursor dispersion during or after it phase separates and forms a supernatant layer above the liquid crystal composition.

2. The process of claim 1 wherein the liquid crystal composition comprises guest dye(s).

3. The process of claim 1 wherein the thermoset or thermoplastic precursor dispersion comprises a material selected from the group consisting of acrylates or methacrylates, vinyls, polyvalent acrylates or methacrylates, cyanoacrylates, polyvalent vinyls, polyvalent epoxides, polyvalent isocyanates, polyvalent allyls, and oligomers or polymers derived therefrom.

4. The process of claim 3 wherein said polyvalent vinyl is vinyl benzene, vinylsilane, or vinyl ether.

5. The process of claim 3 wherein said oligomers or polymers are derived from those containing crosslinkable functional groups.

6. A process for the preparation of a liquid crystal display, which process comprises the steps of:
   a) providing microcups;
   b) filling the microcups with a liquid crystal composition;
   c) sealing the fill d microcups by overcoating onto said liquid crystal composition a thermoset or thermoplastic precursor composition which is at least partially immiscible with said liquid crystal composition and has a specific gravity lower than that of said liquid crystal composition; and
   d) hardening said thermoplastic or thermoset precursor composition.

7. The process of claim 6 wherein the thermoplastic or thermoset precursor composition is diluted with a volatile solvent or solvent mixture which is evaporated after said thermoplastic or thermoset precursor composition is overcoated onto the liquid crystal composition.

8. The process of claim 6 wherein the thermoplastic or thermoset precursor composition is cured by radiation, heat, moisture, or interfacial reactions at the interface between the thermoplastic or thermoset precursor composition and the liquid crystal composition.

9. The process of claim 6 wherein the thermoplastic or thermoset precursor composition comprises a material selected from the group consisting of acrylates or methacrylates, vinyls, polyvalent acrylates or methacrylates, cyanoacrylates, polyvalent vinyls, polyvalent epoxides, polyvalent isocyanates, polyvalent allyls, oligomers or polymers derived therefrom.

10. The process of claim 9 wherein said polyvalent vinyl is vinyl benzene, vinylsilane, or vinyl ether.

11. The process of claim 9 wherein said oligomers or polymers are derived from those containing crosslinkable functional groups.

12. A process for the manufacture of a liquid crystal display, which process comprises the steps of:
   a) preparing microcups on a first conductor film;
   b) filling the microcups with a liquid crystal composition;
   c) sealing the filled microcups; and
   d) laminating the sealed microcups with a second conductor film to form a liquid crystal display.

13. The process of claim 12 wherein said second conductor film is pre-coated with an adhesive layer which is hardenable or crosslinkable by heat, moisture or radiation and curable during or after lamination.

14. A process for the manufacture of a multi-color liquid crystal display, which process comprises the steps of:
   a) preparing microcups on a first conductor film;
   b) laminating the microcups with a layer of a positive photoresist;
   c) imagewise exposing the positive photoresist to selectively open the microcups in a predetermined area;
   d) filling the opened microcups with a liquid crystal composition of a first color;
   e) sealing the microcups filled with the liquid crystal composition of the first color;
   f) repeating Steps c) to e) in different areas with liquid crystal compositions of different colors to generate groups of microcups filed with the liquid crystal compositions of different colors;
   g) removing residual positive photoresist, if any; and
   h) laminating the sealed microcups with a second conductor film to form a multi-color liquid crystal display.

15. The process of claim 12 wherein the filling and sealing of the microcups is accomplished by filling the microcups with the liquid crystal composition and a dispersion of a thermoplastic or thermoset precursor composition which has a specific gravity lower than that of the liquid crystal composition, followed by hardening the thermoplastic or thermoset precursor composition during or after it phase separates and forms a supernatant layer above the liquid crystal dispersion.

16. The process of claim 12 wherein the liquid crystal composition comprises guest dye(s).

17. The process of claim 14 wherein the filling and sealing of the microcups is accomplished by filling the microcups with the liquid crystal composition and a dispersion of a thermoplastic or thermoset precursor composition which has a specific gravity lower than that of the liquid crystal composition, followed by hardening the thermoplastic or thermoset precursor composition during or after it phase separates and forms a supernatant layer above the liquid crystal composition.

18. The process of claim 14 wherein the the liquid crystal composition comprises quest dye(s).

19. The process of claim 12 wherein the sealing of the filled microcups is accomplished by overcoating onto the liquid crystal composition a thermoplastic or thermoset precursor composition which is at least partially immiscible with said liquid crystal composition and has a specific gravity lower than that of said liquid crystal composition, followed by hardening the thermoplastic or thermoset precursor composition.

20. The process of claim 14 wherein the sealing of the filled microcups is accomplished by overcoating onto the liquid crystal composition a thermoplastic or thermoset precursor composition which is at least partially immiscible with said liquid crystal composition and has a specific gravity lower than that of said liquid crystal composition, followed by hardening the thermoplastic or thermoset precursor composition.

21. The process of claim 14 wherein an adhesive layer is precoated on the positive photoresist.

22. The process of claim 21 wherein said adhesive is developable by a developer of the positive photoresist.

23. The process of claim 14 wherein color filters are laminated or coated onto the display.

24. The process of claim 23 wherein said color filters are red, green or blue.

25. The process of claim 1 wherein said microcups are washed before being filled.

26. The process of claim 25 wherein said microcups are washed with hexane.

27. The process of claim 25 wherein said microcups are washed with methylethylketone.

28. The process of claim 6 wherein said microcups are washed before being filled.

29. The process of claim 28 wherein said microcups are washed with hexane.

30. The process of claim 28 wherein said microcups are washed with methylethylketone.

31. The process of claim 12 wherein said microcups are prepared embossing the thermoplastic or thermoset precursor layer with a mate mold.

32. The process of claim 12 wherein said microcups are prepared by imagewise exposing a thermoplastic or thermoset precursor layer and removing the unexposed areas.

33. The process of claim 14 wherein said microcups are prepared by embossing the thermoplastic or thermoset precursor layer with a male mold.

34. The process of claim 14 wherein said microcups are prepared by imagewise exposing a thermoplastic or thermoset precursor layer and removing the unexposed areas.

35. The process of claim 14 wherein said second conductor film is pre-coated with an adhesive layer which is hardenable or cross-linkable by heat, moisture or radiation and curable during or after lamination.

\* \* \* \* \*

UNITED STATES PATENT AND TRADEMARK OFFICE
CERTIFICATE OF CORRECTION

PATENT NO.       : 6,795,138 B2
APPLICATION NO. : 09/759212
DATED            : September 21, 2004
INVENTOR(S)      : Rong-Chang Liang et al.

It is certified that error appears in the above-identified patent and that said Letters Patent is hereby corrected as shown below:

Column 9, at line 17, replace "or a thermoset" with -- or thermoset --.

Column 14, at line 19, delete "is"; at line 26, delete "is"; at line 51, delete "and".

Column 15, Claim 6, at line 5, change "fill d" to -- filled --.

Column 16, Claim 12, at line 5, in step (c) after "microcups", add -- with a thermoplastic or thermoset precursor composition which has a specific gravity lower than that of the liquid crystal composition --;

Column 16, at line 23, at the end of step (e) after "color", add -- with a thermoplastic or thermoset precursor composition which has a specific gravity lower than that of the liquid crystal composition --;

Column 16, at line 34, replace "of a" with -- of said --;

Column 16, at line 35-36, delete "which has a specific gravity lower than that of the liquid crystal composition";

Column 16, at line 45, replace "of a" with -- of said --;

Column 16, at lines 46-48, delete "which has a specific gravity lower than that of the liquid crystal composition";

Column 16, at line 56, replace "a" with -- said --;

Column 16, at line 57-58, delete "and has a specific gravity lower than that of said liquid crystal composition";

Column 16, at line 64, replace "a" with -- said --;

Column 16, at lines 66-67, delete "and has a specific gravity lower than that of said liquid crystal composition".

Column 18, at lines 7-8, replace "a thermoplastic or thermoset precursor layer" with -- a layer of a radiation curable material --;

UNITED STATES PATENT AND TRADEMARK OFFICE
CERTIFICATE OF CORRECTION

PATENT NO. : 6,795,138 B2
APPLICATION NO. : 09/759212
DATED : September 21, 2004
INVENTOR(S) : Rong-Chang Liang et al.

It is certified that error appears in the above-identified patent and that said Letters Patent is hereby corrected as shown below:

Column 18, at lines 13-14, replace "a thermoplastic or thermoset precursor layer" with -- a layer of a radiation curable material --.

Signed and Sealed this

Twenty-fourth Day of July, 2007

JON W. DUDAS
*Director of the United States Patent and Trademark Office*